(12) United States Patent
Melkumyan et al.

(10) Patent No.: US 8,438,121 B2
(45) Date of Patent: May 7, 2013

(54) METHOD AND SYSTEM FOR DATA ANALYSIS AND SYNTHESIS

(75) Inventors: Arman Melkumyan, Lane Cove (AU); Fabio Tozeto Ramos, Erskineville (AU)

(73) Assignee: The University of Sydney, New South Wales (AU)

( * ) Notice: Subject to any disclaimer, the term of this patent is extended or adjusted under 35 U.S.C. 154(b) by 349 days.

(21) Appl. No.: 12/779,922

(22) Filed: May 13, 2010

(65) Prior Publication Data
US 2011/0035346 A1   Feb. 10, 2011

(30) Foreign Application Priority Data

May 13, 2009   (AU) ................................ 2009902150
Apr. 30, 2010   (AU) ................................ 2010901867

(51) Int. Cl.
*G06F 15/18* (2006.01)
(52) U.S. Cl.
USPC ............................................................. 706/12
(58) Field of Classification Search .................... 706/12
See application file for complete search history.

(56) References Cited

U.S. PATENT DOCUMENTS 8,315,838 B2* 11/2012 Durrant-Whyte et al. ........ 703/1
2006/0178887 A1   8/2006 Webber

FOREIGN PATENT DOCUMENTS

AU        2009251043 A1   12/2009

OTHER PUBLICATIONS

PCT International Search Report and Written Opinion for PCT Counterpart Application No. PCT/AU2010/000552 containing Communication relating to the Results of the Partial International Search Report, 13 pgs., (Jul 6, 2010).
C. E. Rasmussen, et al., "Gaussian Processes for Machine Learning", The MIT Press, Massachusetts Institute of Technology, ISBN 026218253X, www.GaussianProcess.org/gpml, 266 pgs., (2006).
Edwin V. Bonilla, et al., "Multi-task Gaussian Process Prediction", Proceedings of Advances in Neural Information Processing Systems 20, 8 pgs., (Dec. 2007).
Edwin V. Bonilla, et al., "Kernel Multi-task Learning using Task-specific Features", Proceedings of the 11th AISTATS, 8 pgs., (Mar. 2007).
Kai Yu, et al., "Learning Gaussian Processes from Multiple Tasks", Proceedings of the 22nd International Conference on Machine Learning, 8 pgs., (Aug. 2005).
Tobias Lang, et al., "Adaptive Non-Stationary Kernel Regression for Terrain Modeling", Proceedings of Robotics: Science and Systems, 8 pgs., (Jun. 2007).
Mauricio Alvarez et al., "Sparse Convolved Gaussian Processes for Multi-output Regression," in D. Koller, Y. Bengio, D. Schuurmans, and L. Bottou (editors), NIPS MIT Press, 8 pgs. (2009).
Jorge Nocedal, et al., "Numerical Optimization", Springer, 12 pages (including Cover Page, Table of Contents, and pp. 192-201), (2006).

* cited by examiner

*Primary Examiner* — Michael B Holmes
(74) *Attorney, Agent, or Firm* — Blakely, Sokoloff, Taylor & Zafman LLP

(57) ABSTRACT

A system (100) for analyzing and synthesizing a plurality of sources of sample data (310, 320) by automated learning and regression. The system includes data storage (110) with a stored multi-task covariance function, and an evaluation processor (102) in communication with the data storage (110). The evaluation processor (102) performs regression using the stored sample data and multi-task covariance function and synthesizes prediction data for use in graphical display or digital control.

31 Claims, 9 Drawing Sheets

(a) Independent GPs with SqExp and SqExp (b) Multi-task GPs with SqExp and SqExp (b) Multi-Kernel GPs with
SqExp (top) and Mat3/2
(bottom)

METHOD AND SYSTEM FOR DATA ANALYSIS AND SYNTHESIS

FIELD OF THE INVENTION

This invention relates to a method and system for data analysis and data synthesis using a smoothing kernel/basis function, as is used in Gaussian processes and other predictive methods and processes. Examples of applications include, but are not limited to, mining, environmental sciences, hydrology, economics and robotics.

BACKGROUND OF THE INVENTION

Computer data modelling, such as for data embodying a spatial representation of a desired characteristic, is frequently useful in fields such as mining and environmental sciences. In the case of mining as an example, it is oftentimes desirable to determine a representation of the spatial distribution of minerals and ores within a body of earth to model and predict the geometry and geology of material in the ground. The in-ground model can then be used for mine planning, drill hole location, drilling operations, blasting, excavation control, direction of excavated material and resource management, amongst other things.

To model an in-ground ore body, for example, sample data can be generated from measurements of mineral concentrations, or related quantities, at discrete locations within a three-dimensional spatial domain including the ore body. The sample data can then be analysed and, using a method of interpolation, synthesised into a model that can be used to make predictions of mineral concentrations at spatial locations distinct from those that were measured. A mathematical technique that has been found useful in this application is regression using the Gaussian process (GP) which is a stochastic process based on the normal (Gaussian) distribution and can be used to good effect as a powerful non-parametric learning technique for spatial modelling. Described by an appropriate covariance function, the GP can be used to infer continuous values within the spatial domain from the distribution of sample measurements. GPs and their application are described in *Gaussian Processes for Machine Learning* (MIT Press, 2006) by C. E. Rassmussen and C. K. I. Williams, the contents of which are incorporated herein by reference.

SUMMARY OF THE INVENTION

According to a first aspect of the invention, there is provided a system for analysing and synthesising data from a plurality of sources of sample data by Gaussian process learning and regression, the system including data storage with a stored multi-task covariance function and associated hyperparameters, and an evaluation processor in communication with the data storage. The evaluation processor performs Gaussian process regression using the stored sample data and multi-task covariance function with the hyperparameters and synthesises prediction data for use in graphical display or digital control. The multi-task covariance function is a combination of a plurality of stationary covariance functions.

In one embodiment, the system further includes a training processor to determine the hyperparameters by analysing the sample data and the multi-task covariance function.

In one embodiment, the sampled measurement data is derived from measurement of a plurality of quantities dependent and distributed over a spatial region or temporal period. The sampled measurement data may be derived from sensors measuring a plurality of quantities at spatially distributed locations within a region. The sensors may measure quantities related to geology and/or rock characteristics within the region.

In one embodiment, the multi-task covariance function is determined by a selected combination of separate stationary covariance functions for each task corresponding to a separate source of sampled measurement data. The covariance functions for each separate task may be the same. Alternatively, the covariance functions for each separate task may be different.

In one embodiment, at least one of the covariance functions combined into the multi-task covariance function is a squared-exponential covariance function.

In one embodiment, at least one of the covariance functions combined into the multi-task covariance function is a Sparse covariance function.

In one embodiment, at least one of the covariance functions combined into the multi-task covariance function is a Matern covariance function.

In one embodiment, the cross-covariance function is determined by selecting a stationary covariance function for each data source task, and combining the plurality of covariance functions using Fourier transform and convolution techniques.

According to a second aspect of the invention, there is provided a method of computerised data analysis and synthesis for estimation of a desired first quantity. The method includes measuring the first quantity and at least one other second quantity within a domain of interest to generate first and second sampled datasets, storing the sampled datasets and selecting first and second stationary covariance functions for application to the first and second datasets. The method then includes determining a multi-task covariance function determined from the selected first and second covariance functions, training a multi-task Gaussian process by computing and storing optimised hyperparameter values associated with the multi-task covariance function using the stored first and second datasets, and performing Gaussian process regression using the selected multi-task covariance function, computed and stored hyperparameters and stored datasets to predict unknown values of the first quantity within the domain of interest.

In one embodiment, the first and second quantities are spatially distributed measureable quantities. The first and second quantities may be derived from geological characteristics within a body of earth.

In one embodiment, the first and second covariance functions are the same. Alternatively, the first and second covariance functions are different.

According to a third aspect of the invention, there is provided a method for determining a Gaussian process for regression of a plurality of related tasks including the steps of receiving a data set associated with each one of the plurality of related tasks, receiving one covariance function associated with each one of the related tasks and, using the data sets and covariance functions to determine a multi-task covariance function, for use with the multi-task Gaussian process.

In one embodiment, the multi-task covariance function is determined in a training phase.

In one embodiment, the multi-task covariance function K is determined from a basis function, g, associated with each covariance function, using the relationship described as follows:

$$K((x, i), (x', j)) = \int_{-\infty}^{\infty} g_i(x-u)g_j(x'-u)du$$

where i and j identify the task number and (x, i), (x', j) represent the points x and x' from the task i and j respectively.

According to a fourth aspect of the invention, there is provided a method for evaluating a task from a Gaussian process regression model, wherein the task is one of a plurality of dependent tasks, and the Gaussian process regression model includes a Gaussian process, the Gaussian process being associated with a covariance function, the covariance function being a multi-task covariance function.

According to a fifth aspect of the invention, there is provided a system for analysing a plurality of data sets, each data set associated with a single-task covariance function. The system includes a multi-task Gaussian process training processor that analyses the plurality of data sets simultaneously to determine a multi-task covariance function. The multi-task covariance function is a combination of the single-task covariance functions.

According to a sixth aspect of the invention, there is provided a system for synthesising a data set from a test input data set, wherein the data set comprises data from one of a plurality of data types, each data type being associated with a single-task covariance function. The system includes a multi-task Gaussian process associated with a multi-task covariance function, wherein the multi-task covariance function is a combination of the single-task covariance functions and a Gaussian process evaluation processor that inputs the test input data set, and uses the multi-task Gaussian process to synthesise the data set.

According to other aspects of the invention, there is provided a method for computer regression of a plurality of related tasks, or a computer system for such regression, including the steps receiving a data set associated with each one of the plurality of related modelling tasks, assigning a data set kernel for each of the data sets and simultaneously modelling the data sets using a kernel process in which the kernel is a convolution of the data set kernels.

In some embodiments, the data set kernel for one of the plurality of data sets is different from the data set kernel for another of the plurality of data sets.

According to still other aspects of the invention, there is provided a method for computer regression of a plurality of related tasks, or a computer system for such regression. Values for inputs X, targets y, covariance function K, noise level $\sigma_n^2$, and test input X* are received, wherein X, y and X* are in the form of block vectors and K is in the form of a block matrix comprising covariance functions for each input X along its diagonal and cross-covariance functions formed by a convolution of covariance functions outside of its diagonal. The covariance function K is applied to the inputs X, targets y, noise level $\sigma_n^2$, and test input X*, in a predictive process and an output of a model of the inputs X is generated.

According to further aspects of the invention, there is provided a computer program and a computer program product comprising machine-readable program code for controlling the operation of a data processing apparatus on which the program code executes to perform the method described herein.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

In an estimation problem such as ore grade prediction in mining, some relationship can exist between grades of different minerals being predicted. Modelling these relationships can significantly improve the prediction quality, reduce the overall uncertainty for each estimation task and provide means for estimation with partial data. A technique in geostatistics for this purpose is known as co-kriging where correlations between variables need to be specified manually.

The problem of simultaneously learning multiple tasks has received increasing attention in the field of machine learning in recent years. This research is motivated by many applications in which it is required to estimate different quantities from a set of input/output data and these quantities have unknown intrinsic inter-dependences. This problem can be framed as that of learning a set of functions where each function corresponding to a particular task is represented by its individual data set. These tasks are inter-dependent in that they share some common underlying structure. Using this inner structure each task can be learned in a more efficient way and empirical studies indicate that one can benefit significantly by learning the tasks simultaneously as opposed to learning them one by one in isolation.

The present invention may be applied to ore grade modelling as described below in a non-limiting example of its implementation. Other applications include environmental sciences, hydrology, economics and robotics.

1. System Overview

Figure 1:
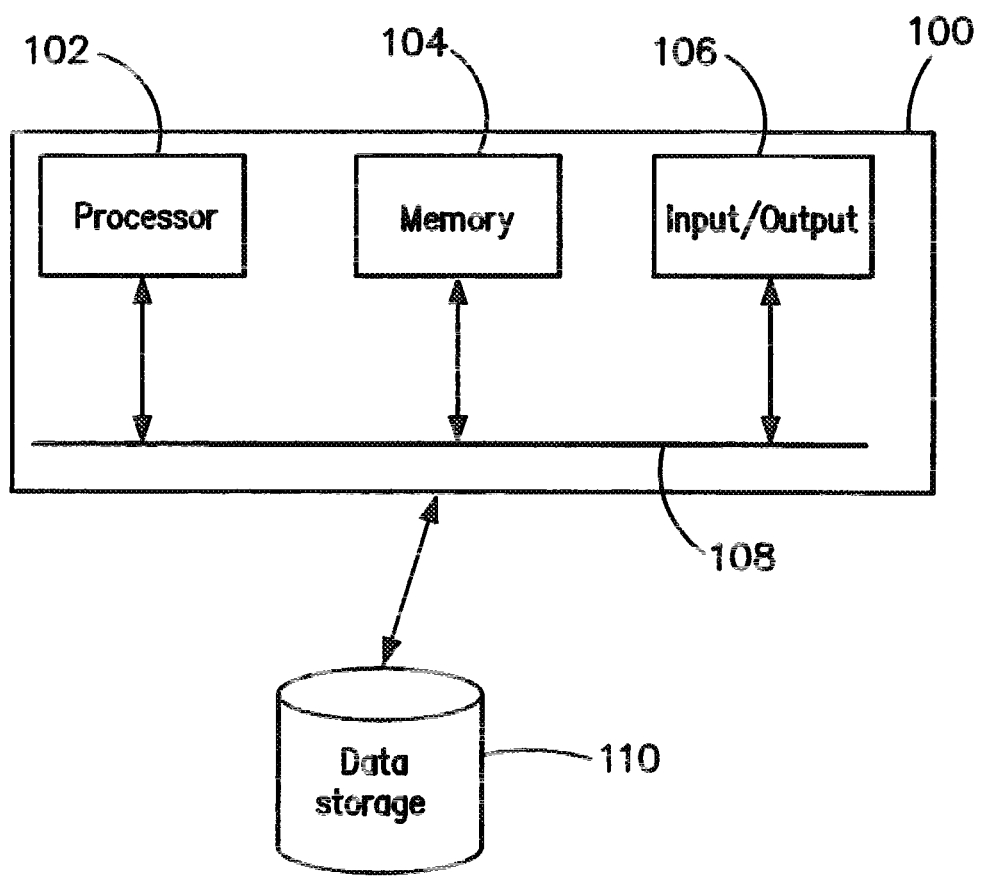
FIG. 1 is a representative diagram of an example computing system which may be used to implement a data modelling system in accordance with an embodiment of the invention.
Figure 2:
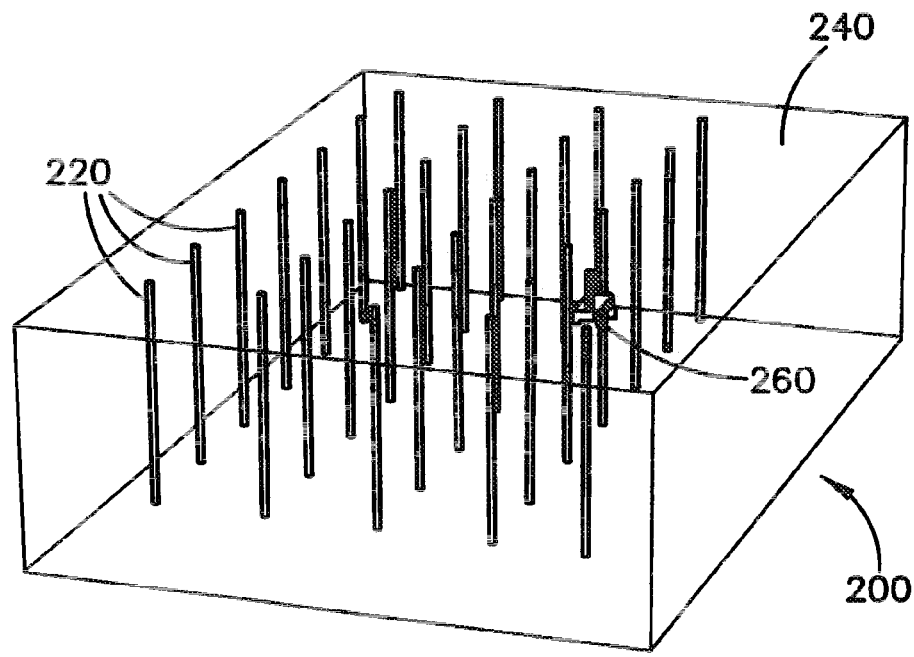
FIG. 2 is a diagrammatic illustration of a mining drill hole pattern.

Referring to FIG. 1, an embodiment of a data modelling system can be implemented with the aid of appropriate computer hardware and software in the form of a computing system 100. The computing system 100 can comprise a processor 102, memory 104 and input/output 106. These components communicate via a bus 108. The memory 104 stores instructions executed by the processor 102 to perform the methods as described herein. Data storage 110 can be connected to the system 100 to store input or output data. The input/output 106 provides an interface for access to the instructions and the stored data. It will be understood that this description of a computing system is only one example of possible systems in which the invention may be implemented and other systems may have different architectures FIG. 2 is a diagrammatic illustration of an orthogonally bounded three-dimensional section of earth 200 incorporating ore of potential interest for mining. The distribution of ore (not shown) within the body of earth 200 may be of particular interest. The amount of ore in the earth can be determined at intervals through an array of drill holes 220 bored from the surface 240 by a movable drill rig 260. The concentration of ore can be measured from samples of material taken from the bore holes 220, at various depths, to generate a dataset representing a three dimensional (3D) spatial array of discrete measurements. In order to infer values of ore concentration at locations not actually measured, the dataset can be applied to GP learning and regression for the purposes of interpolation or extrapolation.

2. Gaussian Processes for Regression

Regression is supervised learning of input-output mappings from empirical data called the training data. Each input-output mapping is referred to as a task. If there are multiple inputs associated with multiple outputs, the problem becomes a multi-task regression problem. Once this mapping has been modelled, for example using Bayesian modelling, it is possible to predict output values for new input data, called test data.

Gaussian processes provide a powerful learning framework for learning models of spatially correlated and uncertain data. A GP framework is used in Bayesian modelling to describe the distribution of outputs for functions used for mapping from an input x to an output f(x). GP regression provides a robust means of estimation and interpolation of spatial information that can handle incomplete sensor data (training data) effectively. GPs are non-parametric approaches in that they do not specify an explicit functional model between the input and output.

A GP is a collection of random variables, any finite number of which have a joint Gaussian distribution. A GP is completely specified by its mean and covariance functions. The mean function m(x) and covariance function k(x, x') of a real process f(x) are defined as:

$$m(x) = E[f(x)] \quad (1)$$

$$k(x,x') = E[(f(x)-m(x))(f(x')-m(x'))] \quad (2)$$

such that the GP is written as $$f(x) \sim GP(m(x), k(x,x')) \quad (3).$$

The mean and covariance functions together describe a distribution over possible functions used for estimation. In the context of modelling in-ground resource distribution, for example, each input x represents a point in 3D space, x≡(x, y, z), and the output, f(x), corresponding to each x is a measurement of ore concentration.

2.1 Covariance Functions

Although not necessary, for the sake of convenience the mean function m(x) may be assumed to be zero by scaling the data appropriately such that it has a mean of zero. This leaves the covariance function to describe the GP. The covariance function models the covariance between the random variables which, here, correspond to sensor measured data.

As part of a non-parametric model, the covariance functions used for GP regression have some free parameters that can be varied, and are optimised using the training data. These parameters are called hyperparameters.

There are numerous covariance functions that can be used to model the spatial variation between the data points. A popular covariance function is the squared-exponential covariance function given as $$k_y(x_p, x_q) = \sigma_f^2 \exp\left(-\frac{1}{2l^2}(x_p - x_q)^2\right) + \sigma_n^2 \delta_{pq} \quad (4)$$

where $k_y$ is the covariance function; l is the length-scale, a measure of how quickly the f(x) value changes in relation to the x value; $\sigma_f^2$ is the signal variance and $\sigma_n^2$ is the noise variance in the data being modelled. The symbol $\delta_{pq}$ represents a Kroeneker Delta defined on indices p and q. The set of parameters l, $\sigma_f$, $\sigma_n$ are referred to as the hyperparameters and specify what sort of values the parameters might take. The squared-exponential covariance function, being a function of |x−x'|, is stationary (invariant to translation).

2.2 Hyperparameters

Training the GP for a given dataset means determining and optimizing the hyperparameters of the underlying covariance function.

Hyperparameters are determined from the data to be modelled. The hyperparameters can be learnt from the training data using a manual process, i.e. using a trial and error process. The hyperparameters can also be learnt using a machine learning process. Typical methods include using leave-one-out cross-validation (LOOCV), also called rotation estimation, and Bayesian learning such as Maximum Likelihood Estimation. In this example, a Maximum Likelihood Estimation method is used.

The log marginal likelihood of the training output (y) given the training input (X) for a set of hyperparameters θ is given by $$\log p(y \mid X, \theta) = -\frac{1}{2} y^T K_y^{-1} y - \frac{1}{2} \log|K_y| - \frac{n}{2} \log(2\pi) \quad (5)$$

where $K_y = K_f + \sigma_n^2 I$ is the covariance matrix for the noisy targets y. The log marginal likelihood has three terms: the first describes the data fit, the second term penalizes model complexity and the last term is simply a normalization coefficient. Thus, training the model will involve searching for the set of hyperparameters that enables the best data fit while avoiding overly complex models. Occam's razor is thus in-built in the system and overfitting is prevented by the very formulation of the learning mechanism.

Using Maximum Likelihood Estimation, training the GP model on a given set of data amounts to finding the optimal set of hyperparameters that maximize the log marginal likelihood (eq. 6). For the squared-exponential covariance function, optimizing the hyperparameters entails finding the optimal set of values for $\theta=\{l_x, l_y, l_z, \sigma_f, \sigma_n\}$. Optimization can be done using standard off-the-shelf optimization approaches. For example, a combination of stochastic search (simulated annealing) and gradient descent (Quasi-Newton optimization with BFGS hessian update) has been found to be successful. Using a gradient based optimization approach leads to advantages in that convergence is achieved much faster. A description and further information about these optimization techniques and others can be found in the text *Numerical Optimization*, by J. Nocedal and S. Wright (Springer, 2006).

2.3 Regression

The learned GP model is used to estimate the quantity of interest (e.g. ore concentration) within a volume of interest, characterized by a grid of points at a desired resolution. This is achieved by performing Gaussian Process regression at the set of test points, given the training dataset and the GP covariance function with the learned hyperparameters.

For additive independent identically distributed Gaussian noise with variance $\sigma_n^2$, the prior on the noisy observations becomes $$\text{cov}(y_p, y_q) = k(x_p, x_q) + \sigma_n^2 \delta_{pq} \quad (6)$$

where $\delta_{pq}$ is a Kroeneker Delta defined on p,q and is =1 iff p=q and 0 otherwise.

The joint distribution of any finite number of random variables of a GP is Gaussian. Thus, the joint distribution of the training outputs y and test outputs f* given this prior can be specified by $$\begin{bmatrix} y \\ f_* \end{bmatrix} \sim N\left(0, \begin{bmatrix} K(X, X) + \sigma_n^2 I & K(X, X_*) \\ K(X_*, X) & K(X_*, X_*) \end{bmatrix}\right). \quad (7)$$

The function values (f*) corresponding to the test inputs (X*), given the training data x and the training output y is given by $$f^*|X,y,X^* \sim N(\bar{f}^*, \text{cov}(f^*))$$

where $$\bar{f}^* = K(X^*,X)[K(X,X)+\sigma_n^2 I]^{-1} y \quad (8)$$

and the uncertainty is given by $$\text{cov}(f) = K(X^*,X^*) - K(X^*,X)[K(X,X+\sigma_n^2 I)]^{-1} K(X,X^*) \quad (9).$$

Denoting K(X, X) by K and K(X, X*) by K*, for a single test point x*, k(x*)=k* is used to denote the vector of covariances between the test point and the set of all training points. The above equations can then be rewritten for a single test point as:

$$\bar{f}^* = k^{T*}(K+\sigma_n^2 I)^{-1} y \quad (10)$$

and $$V[f^*] = k(x^*,x^*) - k^{T*}(K+\sigma_n^2 I)^{-1} k^* \quad (11).$$

Equations (10) and (11) provide the basis for the estimation process. The GP estimates obtained are a best linear unbiased estimate for the respective test points. Uncertainty is handled by incorporating the sensor noise model in the training data. The representation produced is a multi-resolution one in that a spatial model can be generated at any desired resolution using the GP regression equations presented above. Thus, the proposed approach is a probabilistic, multi-resolution one that aptly handles spatially correlated information.

Figure 6:
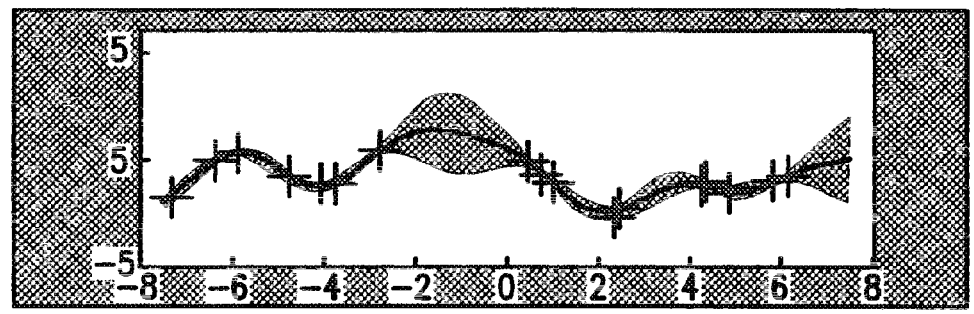
FIG. 6 indicates a plot showing the output from a single task Gaussian process regression.

FIG. 6 is a graphical representation of a single-task Gaussian process modelling one-dimensional data measurements shown as '+' symbols in the drawing. The solid line represents the continuous best estimate for the model, with uncertainty of prediction represented by the width of the shaded region in the drawing. This figure shows that GP regression leads to uncertain outcomes, i.e. results with great variance, in the regions where the data points are not dense.

3. Regression with Interdependent Tasks

Sometimes measurements are taken of multiple characteristics within a spatial domain which are dependent in some way. Iron ore deposits, for example, are frequently accompanied by silicon dioxide in some dependent manner, and the concentrations of each can be measured separately from sample material obtained out of drill holes. A model of the ore deposit may be generated by applying a standard single-task GP to the sample measurements of iron concentrations. It is also possible to exploit the dependence of iron ore on the silicon dioxide. To achieve this, an algorithm is provided that is able to learn the dependence from the training data in a GP framework by learning multiple dependent GP tasks simultaneously.

Single task covariance functions can be used to apply GP regression only to a single task (i.e. a single output function) at a time. If there are many tasks to learn and estimate, then using single-task covariance functions considers the tasks separate from one another and information present in one task is not used to achieve an improved model for another task. Multi-task GPs make it possible to consider different tasks in a single GP regression and to use the intrinsic connections between them to produce better results. The developed new multi-task covariance functions of this invention have the advantage of making it possible for multi-task GPs to:

(1) have different parameters (e.g. length scales) for each individual task, and (2) have different covariance functions for each individual task.

Furthermore, the sets of input data points for different tasks can be different in the input/output data sets. These new possibilities are useful because the different tasks to be learnt and estimated together may be scaled differently or have different appropriate covariance functions because of different inner structures.

A multi-task GP framework involves analysing the multiple datasets simultaneously to learn hyperparameters of a multi-task covariance function that simultaneously models the covariance between the different datasets as well as the covariance amongst data samples within datasets. However, covariance functions suitable for single-task GPs, like the squared-exponential, Sparse and Matern (described further hereinafter) are not directly applicable where multiple GP tasks are to be combined. What is required is a manner of combining single-task covariance functions to be suitable for use in multi-task applications. A method for determining such multi-task covariance functions and applying them is described herein. Mathematical derivations are shown in the appendices to the specification.

Figure 3:
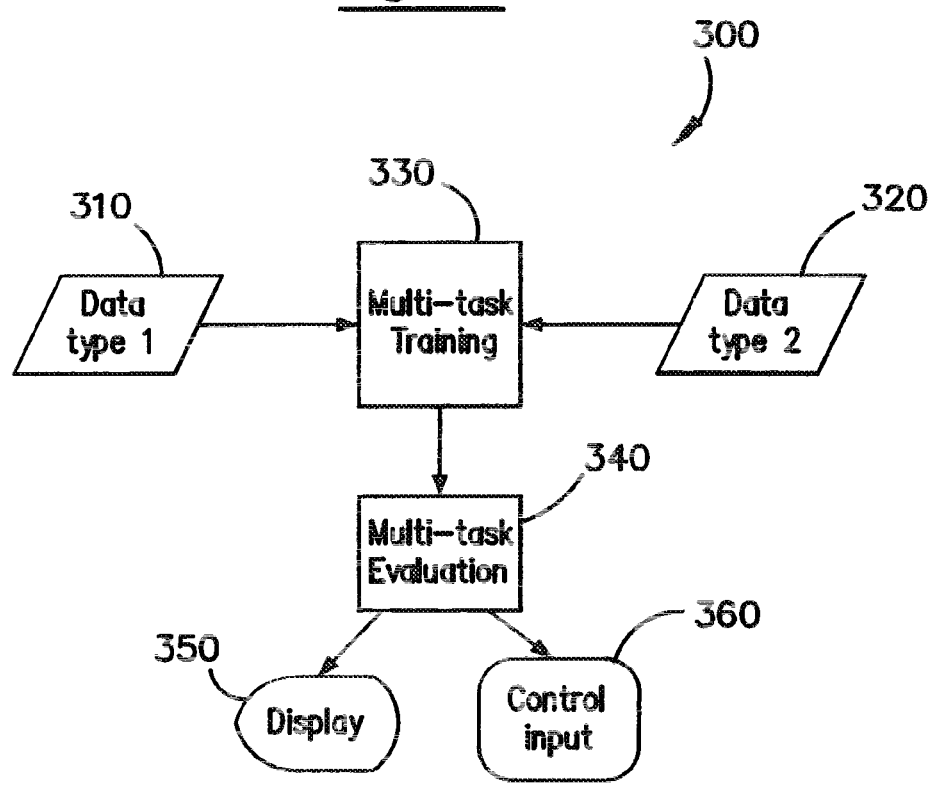
FIG. 3 is a flow chart for data analysis and data synthesis using multi-task Gaussian processes according to one embodiment of the invention.

FIG. 3 is a flow chart for a data analysis and data synthesis system using multi-task Gaussian processes, adapted for use in the mining scenario depicted in FIG. 2. The implemented method can accommodate multiple data types, and is described herein, by way of example, with two data types. The system includes first and second rock characteristic measurement sources that sample characteristics of the material encountered in forming the drill holes 220 (FIG. 2). The rock characteristics measured can be derived during formation of the drill holes by the drill rig 260 by sampling sensors such as accelerometers, tachometers, pressure transducers and torque sensors and classifying rocks in terms of rock factors (hardness, fragmentation) and geology. Other applicable measurement techniques may include down-hole sensing such as natural gamma, and chemical assays, possibly in-situ. Whatever the measured quantity, the measurement is accompanied by spatial position information recorded by the drill rig 260, for example using GPS and/or other positioning methods that provide 3D location information corresponding to each measurement sample.

3.1 The Multi-Task Training Phase

The two different types of measurement sensor data 310, 320 generated by the sensors, including the corresponding spatial positioning information, are provided to a training processor. The sensor data provides the training data required for the regression. The multi-task training step 330 trains the sensor data 310, 320. The training step 330 determines a non-parametric, probabilistic, multi-scale representation of the data for use in modelling the in-ground spatial distribution of ore, which in turn can be used for prediction in the multi-task evaluation step 340. Details of specific operational procedures carried out by the training processor are described below with reference to FIG. 4.

Figure 4:
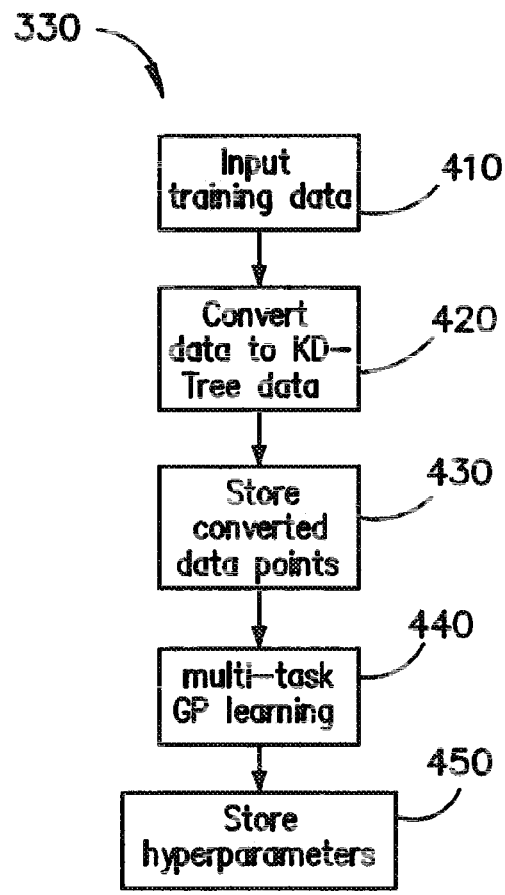
FIG. 4 is a flow chart showing a training phase for a spatial data modelling process, according to one embodiment of the invention.

FIG. 4 is a flow chart diagram showing the multi-task training phase procedure 340 for the ore distribution data modelling process. The training phase 340 begins with obtaining the sensor measurement data at step 410 from an appropriate source, in this case drill sensors and/or chemical and radiological assay measurements with corresponding 3D spatial positioning information. The positioning information and the sensor data together are the observed inputs and observed outputs, respectively, that comprise the training data used for the regression.

For the sake of the current example, one sensor measures and produces data representing a quantity representative of iron content (310) whilst another measures a quantity representing silicon dioxide content (320). The measurements relating to iron and silicon dioxide spatial distribution are distinct but dependent in some unknown way.

For ease of storage and retrieval the data analysed and synthesised by the GP regression method described herein can be saved in the form of a hierarchical data structure known as a KD-Tree. The use of such a data structure provides the training and evaluation processors with rapid access to the sampled measurement data on demand. After the data has been input to the training processor at step 410 it is converted to KD-Tree data at step 420 and stored at step 430.

The data storage step is followed by a multi-task GP learning procedure at step 440, with the objective of learning a representation of the spatial data. The learning procedure is aimed at determining the hyperparameter values of the covariance function associated with the GP. This is done with a Maximum Likelihood Estimation method that is used to optimise the hyperparameters associated with the GP covariance function. The covariance function hyperparameters provide a coarse description of the spatial model, and can be used together with the sensor measurement data to generate detailed model data at any desired resolution, including a statistically sound uncertainty estimate. The optimized covariance function hyperparameters are stored in step 450, together with the KD-Tree sample data structure, for use by the evaluation procedure.

Although the method of obtaining the multi-task GP described here is similar to a standard method of obtaining a single task GP, there are some differences. In the case of a single task GP we have:

a single set of input points $X=[x_1, x_2, \ldots, x_n]^T$;
a single set of targets $y=[y_1, y_2, \ldots, y_n]^T$;
a single scalar noise level $\sigma^2$; and
a single set of test inputs $X^*=[x^*_1, x^*_2, \ldots, x^*_p]^T$.

This results in a single covariance matrix K.

In the case of a multi-task GP, however, when there are m different tasks we have:

m sets of input points $X_i=[x_{i,1}, x_{i,2}, \ldots, x_{i,n_i}]^T$;
m sets of targets $y_i=[y_{i,1}, y_{i,2}, \ldots, y_{i,n_i}]^T$;
m scalar noise levels $\sigma_i^2$; and
m sets of test inputs $X^*_i=[x^*_{i,1}, x^*_{i,2}, \ldots, x^*_{i,n_i}]^T$;

where $i=1.2, \ldots, m$.

The training of the multi-task GPs can be done using the same algorithm as for the single task GP if we take:

X to be the block vector $X=[X_1, X_2, \ldots, X_n]^T$, which in more detail is $X=[x_{1,1}, x_{1,2}, \ldots, x_{1,n_1}, x_{2,1}, x_{2,2}, \ldots, x_{2,n_2}, \ldots, x_{m,1}, x_{m,2}, \ldots, x_{m,n_m}]^T$;

y to be the block vector $y=[y_1, y_2, \ldots, y_n]^T$, which in more detail is $y=[y_{1,1}, y_{1,2}, \ldots, y_{1,n_1}, y_{2,1}, y_{2,2}, \ldots, y_{2,n_2}, \ldots, y_{m,1}, y_{m,2}, \ldots, y_{m,n_m}]^T$;

$X^*$ to be the block vector $X^*=[X^*_1, X^*_2, \ldots, X^*_n]^T$, which in more detail is $X^*=[x^*_{1,1}, x^*_{1,2}, \ldots, x^*_{1,n_1}, x^*_{2,1}, x^*_{2,2}, \ldots, x^*_{2,n_2}, \ldots, x^*_{m,1}, x^*_{m,2}, \ldots, x^*_{m,n_m}]^T$; and K to be the symmetric block matrix $$K = \begin{bmatrix} K_{11} + \sigma_1^2 I_{n_1} & K_{12} & \cdots & K_{1m} \\ K_{21} & K_{22} + \sigma_2^2 I_{n_2} & \cdots & K_{2m} \\ \cdots & \cdots & \cdots & \cdots \\ K_{m1} & K_{m2} & \cdots & K_{mm} + \sigma_m^2 I_{n_m} \end{bmatrix}$$

where $I_{n_i}$ denotes an $n_i \times n_i$ identity matrix.

3.2 The Evaluation Phase

Once the multi-task model has been established, it can be used to estimate new output values for a new set of test inputs.

An evaluation processor is used to execute the evaluation step 340, which entails utilising the measurement data together with multi-task Gaussian process model data according to a desired modelling grid resolution. This grid resolution is the test data for the evaluation process. Specific operational details of the evaluation processor are provided below with reference to FIG. 5.

Figure 5:
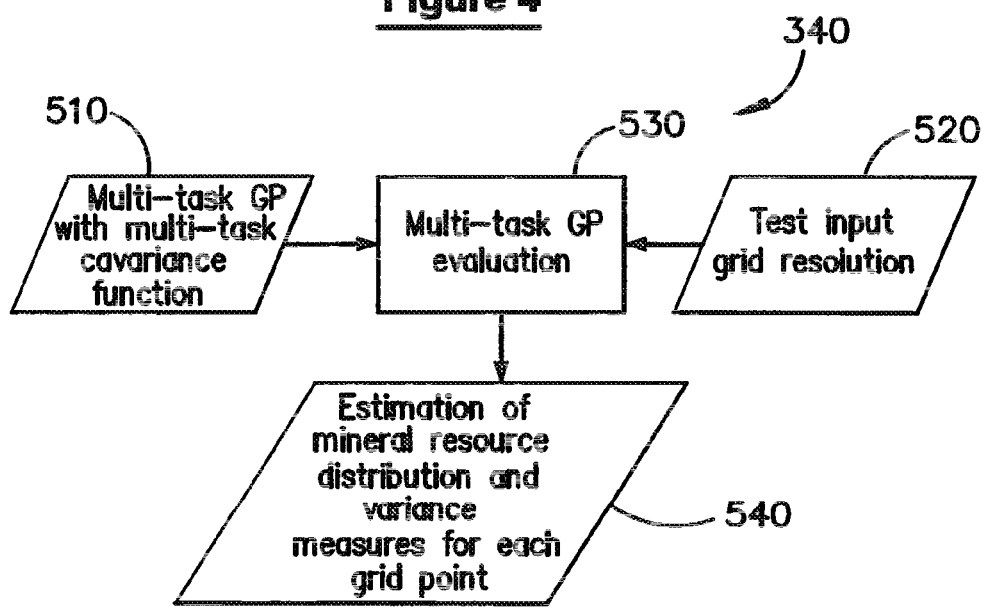
FIG. 5 is a diagrammatic representation of an evaluation phase for the spatial data modelling process, according to one embodiment of the invention.

FIG. 5 is a diagrammatic representation of the evaluation phase procedure 340 for the data modelling process. The multi-task GP evaluation process 530 entails using the model 510 to estimate output values 540 that correspond to the test input values 520. The model is described by the multi-task covariance function that was determined in step 330 of FIG. 3.

Since the Gaussian process representation obtained is a continuous domain one, applying the model for any desired resolution amounts to sampling the model at that resolution. A grid in the area of interest, at the desired resolution, is formed. The required grid resolution provides the test input values 520 for the evaluation process 530.

The objective is to use the learnt spatial model to conduct estimation at individual points in this grid. Each point in the grid is interpolated with respect to the model determined in the previous step and the nearest training data around that point. For this step, using a KD-Tree for storing the data naturally and efficiently provides access to the nearest known spatial data. This together with the learnt model provides an interpolation estimate for the desired location in the grid. The estimate is also accompanied with an uncertainty measure that is simultaneously computed in a statistically sound manner.

The output 540 of the multi-task GP evaluation 530 is a digital representation (shown in FIG. 3 as data that is displayed 350 or is used as a control input 360) of a spatial distributed quantity (e.g. Fe) at the chosen resolution and region of interest together with an appropriate measure of uncertainty for every point in the map.

Evaluation of the GP can be done using a standard prediction algorithm, for example by executing the following steps:
1. Input values for the inputs X, targets y, covariance function K, noise level $\sigma_n^2$, and test input X*.
2. Determine the Cholesky decomposition L=cholesky(K+ $\sigma_n^2$I).
3. Evaluate the predictive mean $\bar{f}^*$ using eq. 10 and the Cholesky decomposition of step 2.
4. Evaluate the predictive variance V[f*] using eq. 11 and the Cholesky decomposition of step 2.
5. Evaluate the log marginal likelihood log p(y|X, θ) using eq. 5.

As is the case in the training step 330, handling multiple tasks in the evaluation step requires that X be the block vector $X=[X_1, X_2, \ldots, X_n]^T$, y be the block vector $y=[y_1, y_2, \ldots, y_n]^T$, X* be the block vector $X^*=[X^*_1, X^*_2, \ldots, X^*_n]^T$, and K be the symmetric block matrix given by:

$$K = \begin{bmatrix} K_{11} + \sigma_1^2 I_{n_1} & K_{12} & \cdots & K_{1m} \\ K_{21} & K_{22} + \sigma_2^2 I_{n_2} & \cdots & K_{2m} \\ \cdots & \cdots & \cdots & \cdots \\ K_{m1} & K_{m2} & \cdots & K_{mm} + \sigma_m^2 I_{n_m} \end{bmatrix}$$

as described above.

Once the ore spatial distribution model data has been generated in the evaluation step 340 it can be displayed graphically for human viewing 350, or used in digital form 360 as input for computer controlled operations, for example.

4. Determining Multi-Task Covariance Functions

What happens in the multi-task training phase described above can be understood within the general framework for calculating inter-task cross-covariance functions for stationary covariance functions, based on the methods of Fourier analysis, as described in this section. New cross-covariance functions are derived for different single task covariance functions; they are calculated in analytical form and can be directly applied.

Using the methods of Fourier analysis a general framework is developed for calculating the cross-covariance functions for any two stationary covariance functions. The resulting $((N_1+N_2+ \ldots +N_M) \times (N_1+N_2+ \ldots +N_M))$ sized covariant matrix, where M is the number of tasks and $N_1, N_2, \ldots, N_M$ are the number of input points in each task, can be shown to be positive semi-definite and is therefore suitable for use in multi-task Gaussian processes. Analytical calculations are also provided for the calculation of cross-covariance functions of different covariance functions.

4.1 Defining the Multi-Task Covariance Function

It is possible to consider several dependent tasks simultaneously. As an example, and with reference to FIG. 7, the case of two dependent tasks is described here, each task associated with a different covariance function. Each covariance function is selected in step 702. The basis functions $g_1(x)$ and $g_2(x)$ of the covariance functions $K_1(x, x')$ and $K_2(x, x')$ can be determined by using Fourier analysis as described in Appendix A and shown in step 704. The basis functions are used to construct the multi-task covariance function for these two covariance functions as shown in step 706.

Constructing the multi-task covariance function includes finding the cross-covariance function between the two covariance functions. Suppose $K_1$ and $K_2$ are single-task stationary covariance functions, it is shown in Appendix A that $K_1$ and $K_2$ can be represented in the following form:

$$K_1(x, x') = \int_{-\infty}^{\infty} g_1(x-u)g_1(x'-u)du \quad (12)$$

$$K_2(x, x') = \int_{-\infty}^{\infty} g_2(x-u)g_2(x'-u)du \quad (13)$$

All stationary covariance functions can be expressed in this form. Consequently, the multi-task covariance function that describes the multi-task GP (step 708) can be defined as:

$$K((x, i), (x', j)) = \int_{-\infty}^{\infty} g_i(x-u)g_j(x'-u)du \quad (14)$$

where i and j identify the task number and (x, i), (x',j) represent the points x and x' from the task i and j respectively.

The proof in Appendix B shows that the multi-task covariance function K((x, i), (x', j)) is positive semi-definite (PSD) for the set of any number of tasks and therefore can be directly used in multi-task GPs. $K_1(x, x')$ and $K_2(x, x')$ can be the same covariance function with the same or different characteristic lengths, or they can be different covariance functions.

The multi-task covariance function of eq. (14) (as described in Appendix B) can be understood as having the following general form for n tasks:

$$\begin{pmatrix} C_{11} & \cdots & C_{1n} \\ \vdots & \ddots & \vdots \\ C_{n1} & \cdots & C_{nn} \end{pmatrix}$$

wherein the diagonal of this matrix, $C_{11}, C_{22}, \ldots, C_{nn}$, is provided by the covariance functions of each of the n tasks. The other off-diagonal terms represent the cross-covariance functions that describe the interdependence between the tasks.

Figure 7:
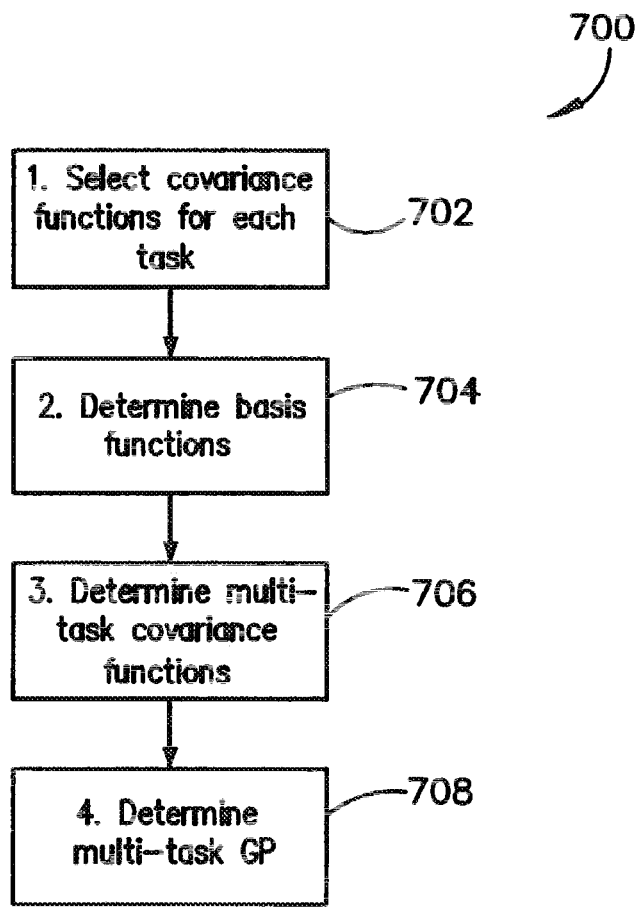
FIG. 7 is a flow chart for the multi-task GP regression method according to one embodiment of the invention.

In step 706 shown in FIG. 7, the multi-task covariance function can be found from the basis functions of the individual covariance functions by using eq. (14). As an example consider the case when there are two tasks with associated covariance functions, $K_1(x, x')$ and $K_2(x, x')$, which are squared exponential covariance functions with different characteristic lengths:

$$K_1(x, x') = \exp\left(-\frac{(x-x')^2}{l_1^2}\right), K_2(x, x') = \exp\left(-\frac{(x-x')^2}{l_2^2}\right). \quad (15)$$

Applying the proposed procedure and calculating the integral present in the multi-task covariance function definition of eq. (14), provides the following multi-task version of the squared exponential covariance function:

$$K((x, i), (x', j)) = \sqrt{\frac{2l_i l_j}{l_i^2 + l_j^2}} \exp\left(-2\frac{(x-x')^2}{l_i^2 + l_j^2}\right). \quad (16)$$

In general, the model is a convolution process of two smoothing kernels (basis functions) assuming the influence of one latent function. It is also possible to extend to multiple latent functions using the process described in M. Alvarez and N. D. Lawrence. Sparse, Convolved Gaussian Processes for Multi-output Regression, in D. Koller, Y. Bengio, D. Schuurmans, and L. Bottou (editors), NIPS MIT Press, 2009.

4.2 Three Example Covariance Functions

In this section the cross-covariance functions of three example covariance functions will be calculated.

1) Sparse Covariance Function

The sparse covariance function is described as follows:

$$K_S(r) = \sigma_0^2 \left[\frac{2 + \cos(2\pi \frac{r}{l})}{3}\left(1 - \frac{r}{l}\right) + \frac{1}{2\pi}\sin\left(2\pi\frac{r}{l}\right)\right]. \quad (17)$$

Sparse covariance functions are described in Australian patent application number 2009900054, "A method and system of data modelling", which is incorporated herein by reference in its entirety.

As previously described:

$$K_S(x,x') = \int g_S(x-u)g_S(x'-u)du \quad (18)$$

where the basis function $g_S(x)$ of the sparse covariance function $K_S$ is defined as $$g_S(x \mid \sigma_{0S}, l_S) = \sigma_{0S}\cos^2\left(\pi\frac{x}{l_S}\right)H\left(\frac{l_S}{2} - |x|\right); \sigma_{0S} = \sqrt{\frac{8}{3}}\sigma_0. \quad (19)$$

From eq. (12)-(14) and (19) it follows that the cross-covariance function of the Sparse covariance function and any other covariance function can be written in the following form of an integral with finite limits:

$$K((x, \text{Sparse}), (x', j)) = \sigma_{0S} \int_{-\frac{l_S}{2}}^{\frac{l_S}{2}} \cos^2\left(\pi\frac{u}{l_S}\right)g_j(x' - x - u)du. \quad (20)$$

Eq. (20) demonstrates an important consequence of the vanishing property of the Sparse covariance function: as the Sparse covariance function vanishes outside of the interval $x\in(-l_S/2, l_S/2)$, the cross-covariance function with it is an integral over only a finite interval, which can be easily computed numerically. If the basis function of the task j does not have a very complicated form, the integral in eq. (20) can be calculated analytically which will significantly speed up calculations.

From eq. (20) it follows that the cross-covariance function of the task j with the Sparse covariance function will vanish outside of some finite interval if and only if the basis function of the task j vanishes outside of some finite interval.

2) Squared Exponential and Matern Covariance Functions

The other two example covariance functions considered here are the following:

$$\text{Squared exponential: } K_{SE}(r) = \sigma_0^2 e^{-\frac{1}{2}\left(\frac{r}{l}\right)^2} \quad (21)$$

$$\text{Matern: } K_M(r) = \sigma_0^2 \frac{2^{1-v}}{\Gamma(v)}\left(\sqrt{2v}\frac{r}{l}\right)^v K_v\left(\sqrt{2v}\frac{r}{l}\right) \quad (22)$$

where l, v, $\alpha$>0, r=|x-x'| and $K_v$ is a modified Bessel function.

For these covariance functions the steps described below correspond to the second 704 and third step 706 of the process shown in FIG. 7.

To find the basis function of the squared exponential and Matern covariance functions we use the Fourier analysis technique presented in Appendix A. Applying Fourier transformation to these functions one has that $$K^*_{SE}(s) = \sigma_0^2 l e^{-\frac{1}{2}s^2 l^2} \quad (23)$$

$$K^*_M(s) = \sigma_0^2\left(\frac{2v}{l^2}\right)^v \sqrt{2}\,\frac{\Gamma(v+1/2)}{\Gamma(v)}\left(s^2 + \frac{2v}{l^2}\right)^{-v-1/2}. \quad (24)$$

Using eq. (12), (43)-(44), (47) (see Appendix A) one has that $$g^*_{SE}(s) = \frac{\sigma_0 \sqrt{l}}{(2\pi)^{1/4}} e^{-\frac{1}{4}s^2 l^2} \quad (25)$$

$$g^*_M(s) = \frac{\sigma_0}{\pi^{1/4}}\left(\frac{2v}{l^2}\right)^{\frac{v}{2}} \sqrt{\frac{\Gamma(v+1/2)}{\Gamma(v)}}\left(s^2 + \frac{2v}{l^2}\right)^{-\frac{v}{2}-\frac{1}{4}}. \quad (26)$$

The next step is to derive the inverse Fourier transformations of $g^*_{SE}(s)$ and $g^*_M(s)$. Comparing eq. (23)-(24) and (25)-(26) one can see that $g^*_{SE}(s)$ and $g^*_M(s)$ can be obtained from $K^*_{SE}(s)$ and $K^*_M(s)$, respectively, by applying the following changes to the parameters:

Squared exponential covariance function:

$$l \to l_{SE} = \frac{l}{\sqrt{2}}; \sigma_0 \to \sigma_{0SE} = \sqrt{\sigma_0}\left(\frac{2}{\pi l^2}\right)^{\frac{1}{8}}. \quad (27)$$

Matern covariance function:

$$v \to v_M = \frac{v}{2} - \frac{1}{4}; l \to l_M = l\sqrt{\frac{1}{2} - \frac{1}{4v}} \quad (28)$$

$$\sigma_0 \to \sigma_{0M} = \sqrt{\sigma_0}\left(\frac{v}{2\pi l^2}\right)^{\frac{1}{8}} \sqrt{\frac{\Gamma\left(\frac{v}{2} - \frac{1}{4}\right)}{\Gamma\left(\frac{v}{2} + \frac{1}{4}\right)}}\left(\frac{\Gamma(v+1/2)}{\Gamma(v)}\right)^{1/4}. \quad (29)$$

Using the associations between eq. (21), (22) and (23), (24) together with the conversion formulas between the images of covariance functions and the images of basis functions presented in eq. (27)-(29) after some algebraic manipulations the following expressions for the basis functions are obtained:

$$g_{SE}(x \mid \sigma_{0SE}, l) = \sigma_{0SE}^2 e^{-\left(\frac{x}{l}\right)^2} \quad (30)$$

$$g_M(x \mid \sigma_{0M}, l, v) = \sigma_{0M}^2 \frac{2^{\frac{5}{4}-\frac{v}{2}}}{\Gamma\left(\frac{v}{2}-\frac{1}{4}\right)} \left(\sqrt{2v}\frac{|x|}{l}\right)^{\frac{v}{2}-\frac{1}{4}} K_{\frac{v}{2}-\frac{1}{4}}\left(\sqrt{2v}\frac{|x|}{l}\right) \quad (31)$$

where $$\sigma_{0SE} = \sqrt{\sigma_0}\left(\frac{2}{\pi l^2}\right)^{\frac{1}{8}}$$

$$\sigma_{0M} = \sqrt{\sigma_0}\left(\frac{v}{2\pi l^2}\right)^{\frac{1}{8}} \sqrt{\frac{\Gamma\left(\frac{v}{2}-\frac{1}{4}\right)}{\Gamma\left(\frac{v}{2}+\frac{1}{4}\right)}} \left(\frac{\Gamma(v+1/2)}{\Gamma(v)}\right)^{1/4}.$$

Using eq. (12)-(14) defining the cross-covariance functions and eq. (19), (30), (31) representing the basis functions we arrive at the following new cross-covariance functions:

$$K_{SE \times SE} = \sigma_{0SE \times SE}^2 \sqrt{\frac{2l_1 l_2}{l_1^2+l_2^2}} e^{-\frac{r^2}{l_1^2+l_2^2}} \quad (32)$$

$$K_{S \times S} = \sigma_{0S \times S}^2 \left(J_{S \times S}\left[\min\left(x+\frac{l_1}{2}, x'+\frac{l_2}{2}\right)\right] - J_{S \times S}\left[\max\left(x-\frac{l_1}{2}, x'-\frac{l_2}{2}\right)\right]\right) \quad (33)$$

$$K_{SE \times S} = \sigma_{0SE \times S}^2 \frac{\sqrt{\pi}}{4} l_{SE}\left[\text{erf}\left(\frac{l_S}{2l_{SE}}-\frac{r}{l_{SE}}\right) + \text{erf}\left(\frac{l_S}{2l_{SE}}+\frac{r}{l_{SE}}\right) + \right. \quad (34)$$

$$e^{-\left(\frac{l_{SE}}{l_S}\pi\right)^2} \times \text{Re}\left(e^{\frac{2\pi r}{l_S}i}\left[\text{erf}\left(\frac{l_S}{2l_{SE}}-\frac{r}{l_{SE}}-i\frac{l_{SE}}{l_S}\pi\right) + \right.\right.$$

$$\left.\left.\text{erf}\left(\frac{l_S}{2l_{SE}}+\frac{r}{l_{SE}}+i\frac{l_{SE}}{l_S}\pi\right)\right]\right)\right]$$

$$K_{M \times S} = \quad (35)$$

$$\sigma_{0M \times S}^2 \int_{-l/2}^{l/2} \cos^2\left(\pi\frac{u}{l_S}\right)\left(\sqrt{2v}\frac{|r-u|}{l}\right)^{\frac{v}{2}-\frac{1}{4}} K_{\frac{v}{2}-\frac{1}{4}}\left(\sqrt{2v}\frac{|r-u|}{l}\right) du$$

$$K_{M \times SE} = \sigma_{0M \times SE}^2 \int \left(\sqrt{2v}\frac{|u|}{l}\right)^{\frac{v}{2}-\frac{1}{4}} K_{\frac{v}{2}-\frac{1}{4}}\left(\sqrt{2v}\frac{|u|}{l}\right) e^{-\left(\frac{r-u}{l_{SE}}\right)^2} du. \quad (36)$$

$K_{SE \times SE}$, $K_{S \times S}$ and $K_{SE \times S}$ are calculated in closed form, $K_{M \times S}$ has finite limits of integration and the integral in $K_{M \times SE}$ converges very quickly as its integrand tends to zero squared exponentially. Therefore all the presented cross-covariance functions are suitable to be directly used for multi-task GP learning and inference.

There are many mathematical equivalents and approximations of the aforementioned cross-covariance functions that may be used for data analysis. The cross-covariance functions $K_{SE \times SE}$, $K_{S \times S}$ and $K_{SE \times S}$ in a different form and a Matern 3/2×Matern 3/2 cross-covariance function are listed in Appendix D.

Figure 8:
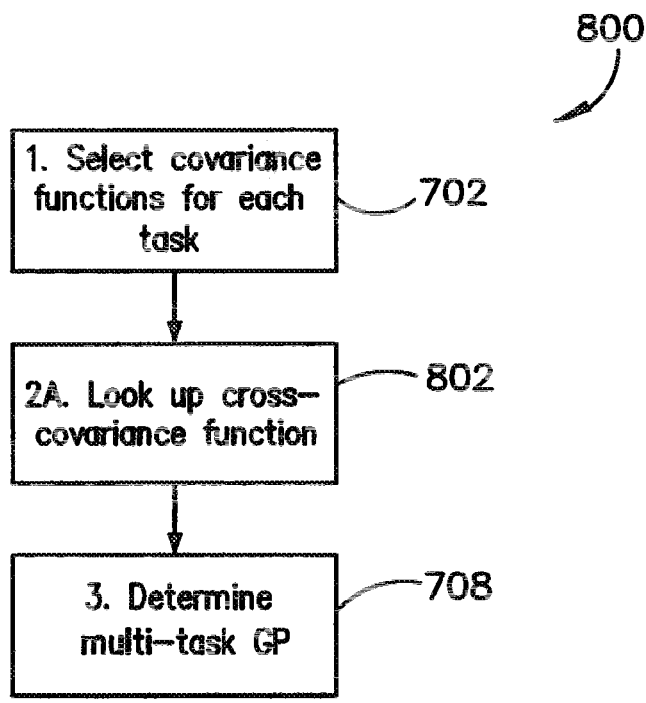
FIG. 8 is a flow chart for the multi-task GP regression method according to one embodiment of the invention.

When eq. 32-36 are used following the first step 702 in the process shown in FIG. 7, then the second 704 and third steps 706 can be omitted. FIG. 8 shows that, in this case, an alternative method 800 is used wherein the second 704 and third steps 706 are replaced by a step 802. In step 802 the multi-task covariance function is looked up if any of the example covariance functions of this section are used, for which the cross-covariance functions are given by eq. 32-36.

Details of the derivation of $K_{S \times S}$ and $K_{SE \times S}$ and the definition of $J_{S \times S}$ are presented in Appendix C.

5. Results of Using Multi-Task GP Regression

Figure 9:
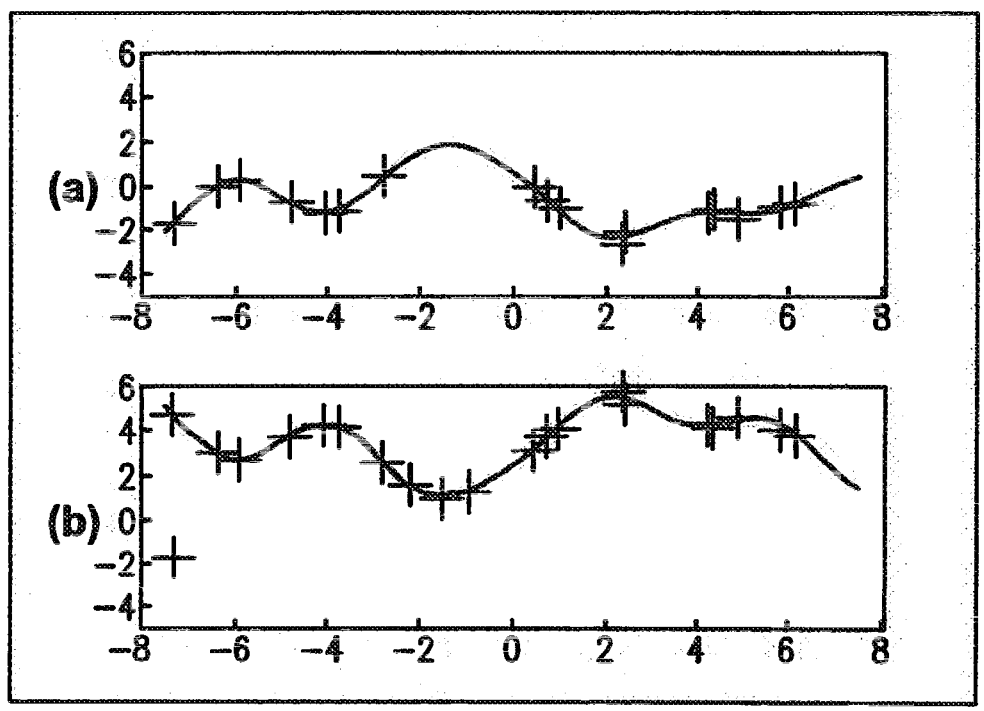
FIGS. 9a) and b) indicate two plots showing the output from a multi-task Gaussian process regression according to one embodiment of the invention.

In ore grade prediction the interdependence between grades of different minerals can be used to improve the prediction quality, reduce the overall uncertainty for each estimation task and provide means for estimation with partial data. The estimated function represented in FIG. 6, for example, could have a reduced variance if a second set of data measurements were known that was in some way related to the first. FIG. 9(a) graphically shows the same data modelled using a multi-task GP that considers cross-covariance with an additional dataset, graphically illustrated in FIG. 9(b). This figure demonstrates that the multi-task GP learns intrinsic inter-task connections in different regions and therefore leads to more confident results (i.e. results with less variance) even in the regions with low density of data points.

Figure 10:
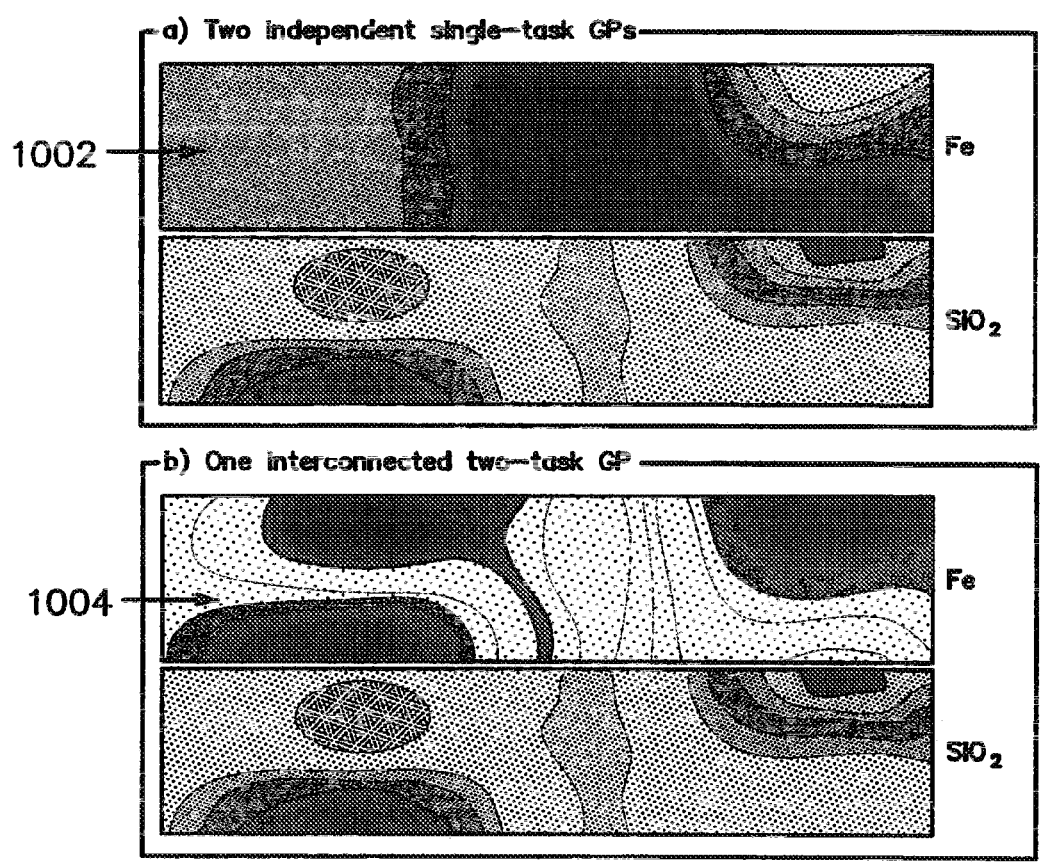
FIGS. 10 a) and b) graphically illustrate the results of data modelling two independent single-task Gaussian processes and one interconnected two-task Gaussian process, respectively.
Figure 11A:
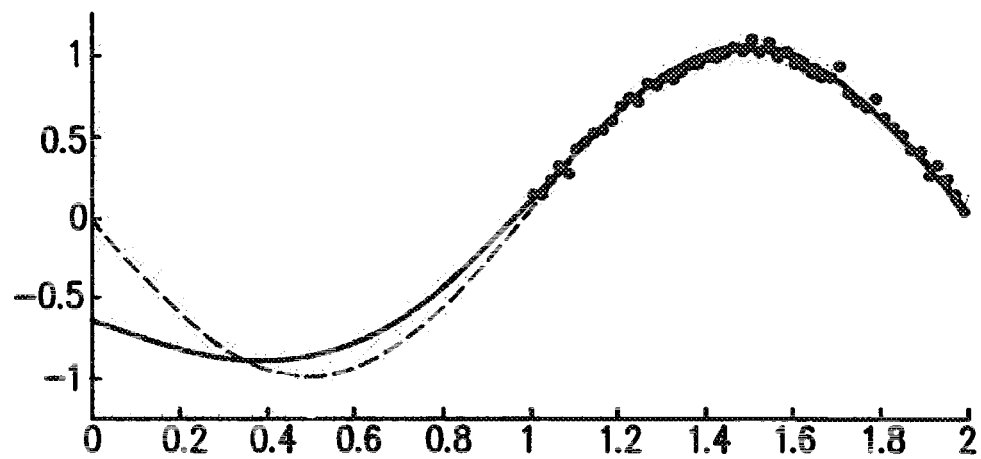
FIGS. 11A to 11C graphically illustrate an example of using a multi-kernel methodology in an example having two dependent tasks, the figures showing predictive mean and variance for respective independent, multi-task and multi-kernel GP's.
Figure 11A:
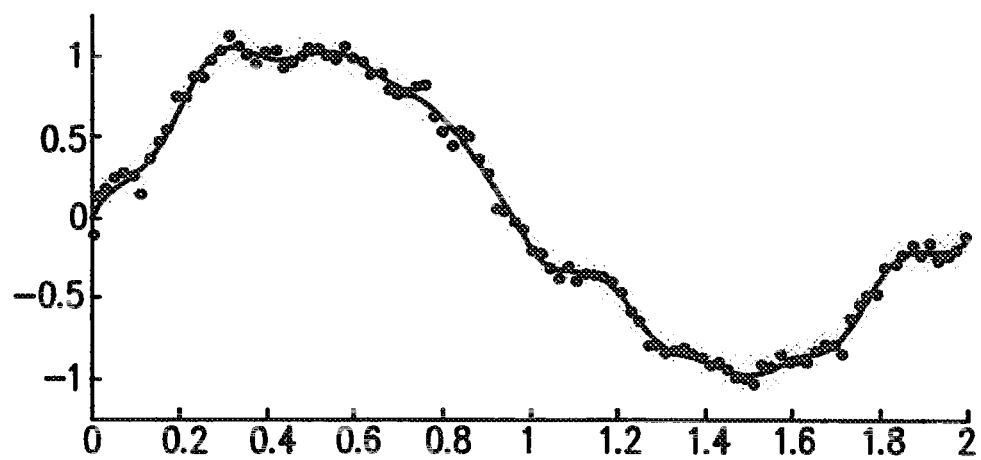
Figure 11B:
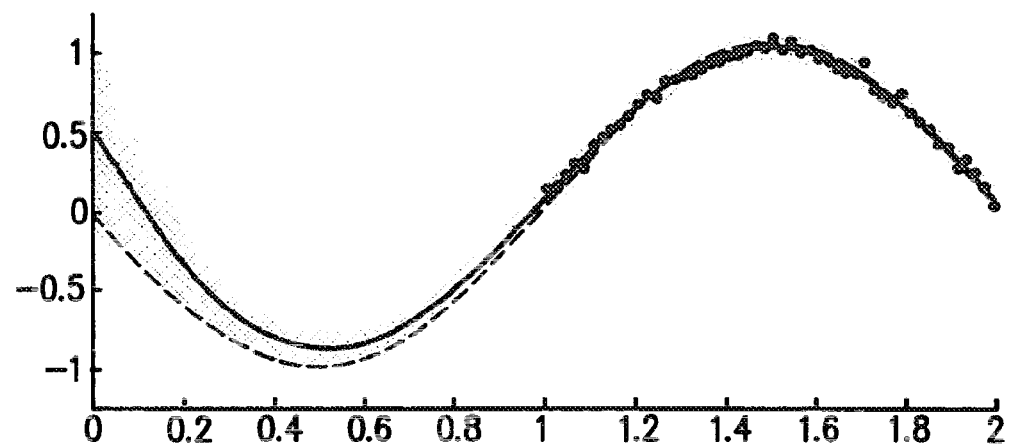
Figure 11B:
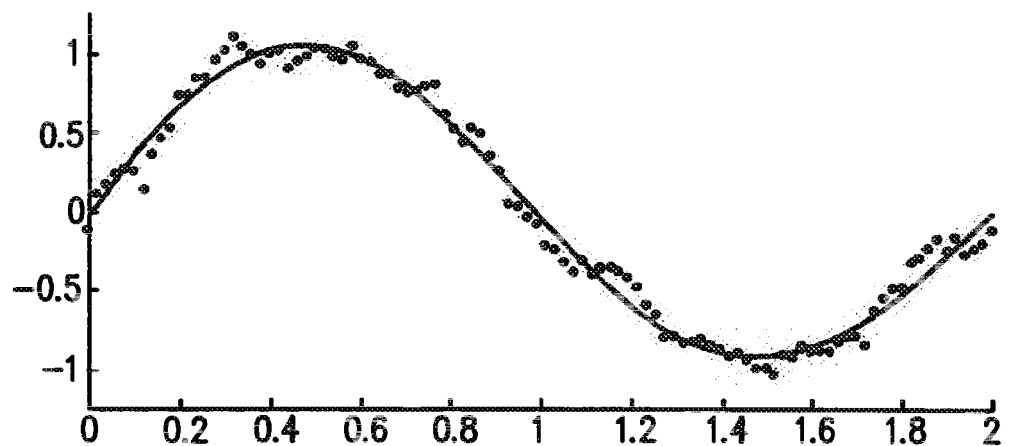
Figure 11C:
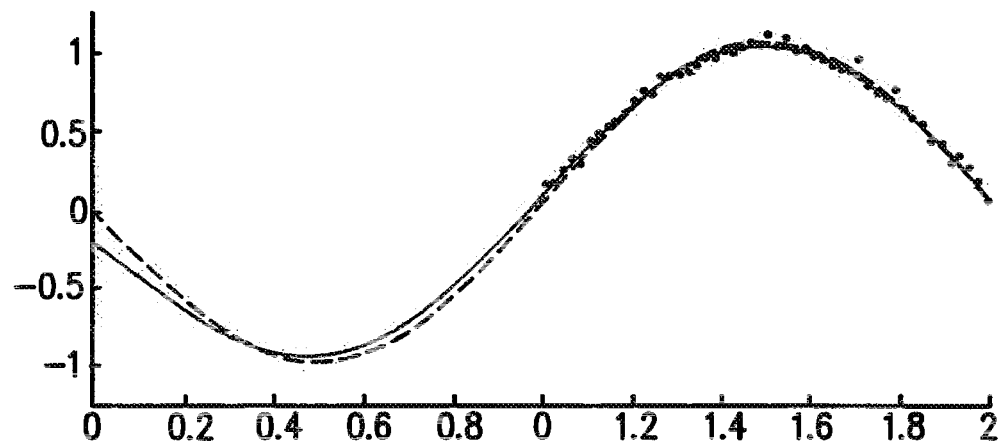
Figure 11C:
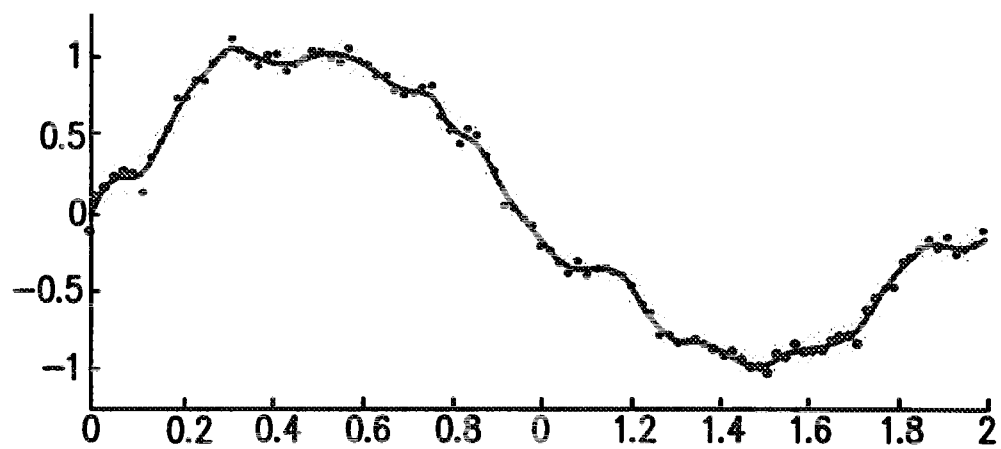

FIG. 10 graphically demonstrates how a three-dimensional multi-task GP with the proposed covariance function can provide information about the regions where data is missing or is not complete. FIG. 10a) shows the single task GP regression results for iron with about 30% of its data removed, and for silicon dioxide with full data, i.e. with information from all the drill holes. The drawing shows only the front views of the 3D in-ground resource estimation results. The first part of FIG. 10a) clearly demonstrates that the single task GP is unable to provide reasonable estimations in the region 1002 where the data is missing. For FIG. 10b) a two-task GP was used to learn iron and silicon dioxide distributions simultaneously. The GP regression with the proposed multi-task approach learns the intrinsic connections between the grade distributions of iron and silicon dioxide where the data for both of them is available and based on that connection estimates the distribution of iron for the 30% of the volume where the data is actually missing. The results can be seen by comparing region 1004 in FIG. 10b) with region 1002. These plots demonstrate that the proposed approach is able to provide good estimation even in the case when a significant portion of the data is missing.

Another experiment demonstrates the benefits of using the multi-kernel methodology in an artificial 1-D problem for two dependent tasks. The observations for the first task are generated from a minus sine function corrupted with Gaussian noise. Only the observations for the second part of the function are used and the objective is to infer the first part from observations of the second task. Observations for the second task were generated from a sine function with some additional complexity to make the function less smooth and corrupted by Gaussian noise. A comparison between independent GP predictions, multi-task GP with squared exponential kernel for both tasks, and the multi-kernel GP (squared exponential kernel for the first task and Matérn 3/2 for the second) is presented in FIGS. 11A to 11C. It can be observed in FIG. 11C that the multi-kernel GP models the second function more accurately. This helps in providing a better prediction for the first task. In FIG. 11 the dots represent the observations and the dashed line represents the ground truth for task 1. The extent of the shaded region around the lines is indicative of prediction accuracy.

Despite the simplicity of this experiment it simulates a very common phenomenon in grade estimation for mining. Some elements have a much higher concentration variability but follow the same trend as others. Being able to aptly model these dependencies from noisy x-ray lab samples is essential for an accurate final product.

This is empirically demonstrated in a further experiment. 1363 samples from an iron ore mine were collected and analyzed in a laboratory with x-ray instruments to determine the concentration of three components: iron, silica and alumina. Iron is the main product but equally important is to assess the concentration of the contaminants silica and alumina. The samples were collected from exploration holes of about 200 m deep, distributed in an area of 6 km². Each hole was divided into 2 meter sections for laboratory assessment, the lab result for each section was then an observation in the dataset. The final dataset consisted of 4089 data points representing 31 exploration holes. Two holes were separated to use as testing data. For these holes the concentration of silica given iron and alumina was predicted. The experiment was repeated employing different multi-task covariance functions with either squared exponential or Matérn kernel for each task combined with the cross-covariance terms presented in Appendix D. The results are summarized in Table 1 which demonstrates that the dependencies between iron, silica and alumina are better captured by the Matérn 3/2×Matérn 3/2× SqExp multi-kernel covariance function.

TABLE 1

Mean and standard deviation of absolute error

| Kernel for Fe | Kernel for $SiO_2$ | Kernel for $Al_2O_3$ | Absolute Error |
| --- | --- | --- | --- |
| SqExp | SqExp | SqExp | 2.7995 ± 2.5561 |
| Matérn 3/2 | Matérn 3/2 | SqExp | 2.2293 ± 2.1041 |
| Matérn 3/2 | SqExp | Matérn 3/2 | 2.8393 ± 2.6962 |
| SqExp | Matérn 3/2 | Matérn 3/2 | 3.0569 ± 2.9340 |
| Matérn 3/2 | Matérn 3/2 | Matérn 3/2 | 2.6181 ± 2.3871 |

In a still further experiment GP's with different multi-kernel covariance functions were applied to the Jura dataset, a benchmark dataset in geostatistics. It consists of a training set with 259 samples in an area of 14.5 km² and a testing set with 100 samples. The task is to predict the concentration of cadmium (Cd), lead (Pb) and zinc (Zn) at new locations. The proposed multi-kernel covariance functions enable considering different kernels for each of the materials thus maximizing the predictive qualities of the GP. The 259 training samples were used at the learning stage and the 100 testing samples were used to evaluate the predictive qualities of the models. The square root mean square error (SMSE) for all possible triplet combinations of SqExp and Matérn 3/2 kernels are presented in Table 2. The results demonstrate that the dependencies between cadmium, lead and zinc are better captured by the Matérn 3/2×SqExp×SqExp triplet-kernel.

TABLE 2

Square root mean square error for cadmium (Cd), lead (Pb) and zinc (Zn) for all possible triplet-kernels combining SqExp and Matérn 3/2.

| Kernel for Cd | Kernel for Pb | Kernel for Zn | SMSE Cd | SMSE for Pb | SMSE for Zn |
| --- | --- | --- | --- | --- | --- |
| SqExp | SqExp | SqExp | 1.0231 | 13.7199 | 42.4945 |
| Matérn 3/2 | Matérn 3/2 | Matérn 3/2 | 0.9456 | 11.9542 | 38.7402 |
| Matérn 3/2 | Matérn 3/2 | SqExp | 0.9079 | 11.4786 | 42.1452 |
| Matérn 3/2 | SqExp | Matérn 3/2 | 0.8239 | 9.7757 | 36.2846 |
| SqExp | Matérn 3/2 | Matérn 3/2 | 1.0375 | 12.4937 | 39.6459 |
| SqExp | SqExp | Matérn 3/2 | 0.8214 | 9.9625 | 37.8670 |
| SqExp | Matérn 3/2 | SqExp | 1.0269 | 12.087 | 42.6403 |
| Matérn 3/2 | SqExp | SqExp | 0.7883 | 9.7403 | 34.4978 |

In a still further experiment a concrete slump dataset was considered. This dataset contains 103 data points with seven input dimensions and 3 outputs describing the influence of the constituent parts of concrete on the overall properties of the concrete. The seven input dimensions are cement, slag, fly ash, water, SP, coarse aggregate and fine aggregate and the outputs are slump, flow and 28-day compressive strength of concrete. 83 data points were used for learning and 20 data points were used for testing. The square root mean square error (SMSE) for all possible triplet combinations of SqExp and Matérn 3/2 kernels for this dataset are presented in Table 3. The results demonstrate that the dependencies between slump, flow and 28-day compressive strength of concrete are better captured by the SqExp×Matérn 3/2×Matern 3/2 triplet-kernel.

TABLE 3

Square root mean square error for slump, flow and strength of concrete for all possible triplet-kernels combining SqExp and Matérn 3/2.

| Kernel for Slump | Kernel for Flow | Kernel for Strength | SMSE for Slump | SMSE for Flow | SMSE for Strength |
| --- | --- | --- | --- | --- | --- |
| SqExp | SqExp | SqExp | 13.8776 | 820.4181 | 733.1642 |
| Matérn 3/2 | Matérn 3/2 | Matérn 3/2 | 13.6224 | 820.6727 | 733.5744 |
| Matérn 3/2 | Matérn 3/2 | SqExp | 14.7709 | 821.8064 | 733.0741 |
| Matérn 3/2 | SqExp | Matérn 3/2 | 14.2670 | 822.7529 | 733.5768 |
| SqExp | Matérn 3/2 | Matérn 3/2 | 13.5690 | 820.3678 | 732.7032 |
| SqExp | SqExp | Matérn 3/2 | 15.3459 | 821.1577 | 733.6685 |
| SqExp | Matérn 3/2 | SqExp | 16.2332 | 824.4468 | 733.7083 |
| Matérn 3/2 | SqExp | SqExp | 13.7503 | 845.5608 | 741.3144 |

One aspect of the invention provides a novel methodology to construct cross covariance terms for a multi-task Gaussian process. This methodology allows the use of multiple covariance functions for the same multi-task prediction problem. If a stationary covariance function can be written as a convolution of two identical basis functions, a cross covariance term can always be defined resulting in a positive definite multi-task covariance matrix. A general methodology to fund the basis function is then developed based on Fourier analysis.

Analytical solutions for six combinations of covariance functions are provided, three of them combining different covariance functions. The analytical forms for the cross covariance terms can be directly applied to GPs prediction problems but are useful for other kernel machines.

A multi-task sparse covariance function is presented which provides computationally efficient (and exact) way of performing inference in large datasets. Note however that approximate techniques can also be used.

The approach may be extended to non-stationary covariance functions, possibly combining non-stationary and stationary kernels. This can be useful in applications involving space and time domains such as pollution estimation or weather forecast.

The presented method not only provides possibilities for better fitting the data representing multiple quantities but also makes it possible to recover missing data. It provides means for estimating missing data in different regions for different tasks based on the intrinsic inter-task connections and information about other tasks in these regions (e.g. if the information for grades of some materials is missing for some drill holes, it can be inferred based on the information about the grades of other materials in these drill holes and the intrinsic connections between distributions of all these materials learned using the proposed approach).

Although the foregoing description relates to specific mine related models where the proposed method can be directly used in in-ground resource estimation (i.e. simultaneous learning of different materials' grade distribution taking into consideration their intrinsic inter-dependences), it will be readily appreciated that the spatial data modelling methodologies described herein are not limited to this application and can be used in many areas including geophysics, mining, hydrology, reservoir engineering, multi agent robotics (e.g. simultaneous learning of information provided by different sensors mounted to several vehicles and/or developing a control system that utilises a model of the dependencies between the control outputs for a plurality of actuators) and financial predictions (e.g. simultaneous learning of variances in exchange rates of different currencies or simultaneous learning of the dynamics of different share prices taking into consideration intrinsic inter-task connections).

It will be understood that the term 'comprises' (and grammatical variants thereof) as used in this specification is equivalent to the term 'includes' and is not to be taken as excluding the existence of additional elements, features or steps.

It will be understood that the invention disclosed and defined in this specification extends to all alternative combinations of two or more of the individual features mentioned or evident from the text or drawings. All of these different combinations constitute various alternative aspects of the invention.

APPENDIX A

General Framework Based on Fourier Analysis

Suppose that $K(\tau)$ is a stationary covariance function in $R^D$ with a spectral density $S(s)$. In this case $K(\tau)$ and $S(s)$ are Fourier duals of each other, i.e.

$$K(\tau) = F_{s \to \tau}^{-1}[S(s)](\tau), \quad S(s) = F_{\tau \to s}[K(\tau)](s) \tag{37}$$

where $\tau = x - x'$ and the direct and inverse Fourier transformations are defined as follows:

$$\tilde{h}(s) = F_{x \to s}[h(x)] = \int_{R^D} h(x) e^{-2\pi i s \cdot x} dx, \tag{38}$$

$$h(x) = F_{s \to x}^{-1}[\tilde{h}(s)] = \int_{R^D} \tilde{h}(s) e^{2\pi i s \cdot x} ds.$$

Another definition for the direct and inverse Fourier transformations can be stated as:

$$h^*(s) = F_{x \to s}[h(x)] = \frac{1}{\sqrt{2\pi}} \int_{R^D} h(x)e^{is \cdot x} dx, \quad (39)$$

$$h(x) = F_{s \to x}^{-1}[h^*(s)] = \frac{1}{\sqrt{2\pi}} \int_{R^D} h^*(s)e^{-is \cdot x} ds.$$

From equations (38) and (39) one has that $$F_{x \to s}[h(x)](s) = \frac{1}{\sqrt{2\pi}} \int_{R^D} h(x)e^{is \cdot x} dx = \int_{R^D} h(x\sqrt{2\pi}) e^{-2\pi i \frac{-s}{\sqrt{2\pi}} \cdot x} dx \quad (40)$$

so that these two definitions are related to each other as follows:

$$F_{x \to s}[h(x)](s) = F_{x \to s}\left[h(x\sqrt{2\pi})\right]\left(\frac{-s}{\sqrt{2\pi}}\right) \quad (41)$$

$$F_{x \to s}[h(x)](s) = F_{x \to s}\left[h\left(\frac{x}{\sqrt{2\pi}}\right)\right](-s\sqrt{2\pi}). \quad (42)$$

General Formulae for the Basis Functions

Assume that the covariance function $K(x, x')$ can be represented in the following form:

$$K(x, x') = \int_{R^D} g(x-u)g(u-x')du. \quad (43)$$

Changing the variable of integration in eq. (43) we obtain $$K(x, x') = \int_{R^D} g(x-x'-u)g(u)du = \int_{R^D} g(u)g(\tau - u)du. \quad (44)$$

If also $$g(u) \equiv g(-u)$$

then from eq. (44) we have that $$K(x, x') = \int_{R^D} g(\tau + u)g(-u)du = \int_{R^D} g(u)g((-\tau) - u)du. \quad (45)$$

From eq. (44) and (45) it follows that $$K(x, x') = K(\tau) = K(-\tau) \quad (46)$$
$$= \int_{R^D} g(u)g(\tau - u)du$$
$$= (g * g)(\tau)$$

where * stands for convolution.

Applying the Fourier transformation to eq. (46) and using the fact that the Fourier transformation of the convolution of two functions is equal to $\sqrt{2\pi}$ times the product of the Fourier transformations of the functions being convoluted, i.e.

$$(g_1(x) * g_2(x))^*(s) = \sqrt{2\pi} g_1^*(s) g_2^*(s)$$

one has that $$K^*(s) = \sqrt{2\pi}(g^*(s))^2 \quad (47).$$

Using eq. (47) and (39) one can calculate the basis function using the covariance function as follows:

$$g(x) = \frac{1}{(2\pi)^{1/4}} F_{s \to x}^{-1}\left[\sqrt{F_{x \to s}[K(x)]}\right]. \quad (48)$$

Appendix B
Multi-Task Covariance Function $K((x, i), (x', j))$ is Positive Semi-Definite For any points $x_1, x_2, \ldots, x_p \in \text{task1}$ and $x'_1, x'_2, \ldots, x'_q \in \text{task2}$ and arbitrary numbers $a_1, a_2, \ldots, a_p, a'_1, a'_2, \ldots, a'_q$ consider the quadratic form $$Q = (A, A')\begin{pmatrix} \Omega_{11} & \Omega_{12} \\ \Omega_{21} & \Omega_{22} \end{pmatrix}\begin{pmatrix} A^T \\ A'^T \end{pmatrix}$$

where $A = (a_1, a_2, \ldots, a_p), A' = (a'_1, a'_2, \ldots, a'_q)$ $\Omega_{11} = [K((x_i,1),(x_j,1))]_{i,j=\overline{1,p}}$ $\Omega_{12} = [K((x_i,1),(x_t,2))]_{i=\overline{1,p}; t=\overline{1,q}}$ $\Omega_{21} = [K((x_t,2),(x_j,1))]_{t=\overline{1,q}; j=\overline{1,p}}$ $\Omega_{22} = [K((x'_t,2),(x'_t,2))]_{l,t=\overline{1,q}}.$ Conducting algebraic manipulations we have that $$Q = A\Omega_{11}A^T + A'\Omega_{21}A^T + A\Omega_{12}A'^T + A'\Omega_{22}A'^T$$

$$= \sum_{i,j=1}^{p} a_i a_j \int_{-\infty}^{\infty} g_1(x_i - u)g_1(x_j - u)du +$$

$$\sum_{l=1}^{q}\sum_{j=1}^{p} a'_l a_j \int_{-\infty}^{\infty} g_2(x'_l - u)g_1(x_j - u)du +$$

$$\sum_{i=1}^{p}\sum_{t=1}^{q} a_i a'_t \int_{-\infty}^{\infty} g_1(x_i - u)g_2(x'_t - u)du +$$

$$\sum_{l,t=1}^{q} a'_l a'_t \int_{-\infty}^{\infty} g_2(x'_l - u)g_2(x'_t - u)du$$

where interchanging the summation and integration we obtain $$Q = \int_{-\infty}^{\infty}\left[\left(\sum_{i=1}^{p} a_i g_1(x_i - u)\right)^2 + \left(\sum_{l=1}^{q} a'_l g_2(x'_l - u)\right)^2 + 2\left(\sum_{i=1}^{p} a_i g_1(x_i - u)\right)\left(\sum_{l=1}^{q} a'_l g_2(x'_l - u)\right)\right]du$$

so that $$Q = \int_{-\infty}^{\infty} \left( \sum_{i=1}^{p} a_i g_1(x_i - u) + \sum_{l=1}^{q} a'_l g_2(x'_l - u) \right)^2 \geq 0.$$

Using the same procedure the inequality $Q \geq 0$ can be proved for any number of tasks.

Appendix C

Derivation of the Sparse Cross-Covariance Function $K_{S \times S}$

We have that $$K_{S \times S}(x, x') = \sigma_{0S}^2 \int_{-\infty}^{\infty} \cos^2\left(\pi \frac{x-u}{l_1}\right) \quad (49)$$
$$H\left(\frac{l_1}{2} - |x - u|\right) \cos^2\left(\pi \frac{x'-u}{l_2}\right) H\left(\frac{l_2}{2} - |x' - u|\right) du.$$

From eq. (49) it follows that $$K_{S \times S}(x, x') = 0 \text{ if } \left(x - \frac{l_1}{2}, x + \frac{l_1}{2}\right) \cap \left(x' - \frac{l_2}{2}, x' + \frac{l_2}{2}\right) = \varnothing, \quad (50)$$

so that $$K_{S \times S}(x, x') = 0 \text{ if } \max\left(x - \frac{l_1}{2}, x' + \frac{l_2}{2}\right) \geq \min\left(x + \frac{l_1}{2}, x' + \frac{l_2}{2}\right).$$

Now assuming that $$\max\left(x - \frac{l_1}{2}, x' - \frac{l_2}{2}\right) < \min\left(x + \frac{l_1}{2}, x' + \frac{l_2}{2}\right)$$

the expression of $K_{S \times S}(x, x')$ given in eq. (49) can be written in the following form:

$$K_{S \times S}(x, x' \mid l_1, l_2) = \quad (51)$$
$$\sigma_{0S}^2 \int_{\max(x - \frac{l_1}{2}, x' - \frac{l_2}{2})}^{\min(x + \frac{l_1}{2}, x' + \frac{l_2}{2})} \cos^2\left(\pi \frac{x-u}{l_1}\right) \cos^2\left(\pi \frac{x'-u}{l_2}\right) du.$$

Via direct calculations the following indefinite integral is obtained:

$$J_{S \times S}(u) = \int \cos^2\left(\pi \frac{x-u}{l_1}\right) \cos^2\left(\pi \frac{x'-u}{l_2}\right) du \quad (52)$$

$$= \frac{1}{16\pi} \left[ 4\pi u + 2 l_1 \sin\left(2\pi \frac{u-x}{l_1}\right) + 2 l_2 \sin\left(2\pi \frac{u-x'}{l_2}\right) + \right.$$

$$\frac{l_1 l_2}{l_1 + l_2} \sin\left(2\pi \left(\frac{u-x}{l_1}\right) + \left(\frac{u-x'}{l_1}\right)\right) - $$

$$\left. \frac{l_1 l_2}{l_1 - l_2} \sin\left(2\pi \left(\frac{u-x}{l_1}\right) - \left(\frac{u-x'}{l_1}\right)\right) \right].$$

From Equations (51), (52) we have that $$K_{S \times S}(x, x' \mid l_1, l_2) = \quad (53)$$
$$\sigma_{0S}^2 \left( J_{S \times S}\left[\min\left(x + \frac{l_1}{2}, x' - \frac{l_2}{2}\right)\right] - J_{S \times S}\left[\max\left(x - \frac{l_1}{2}, x' - \frac{l_2}{2}\right)\right]\right).$$

Derivation of the Squared Exponential-Sparse Cross-Covariance Function $K_{SE \times S}$ From eq. (12)-(14), (19), (31) one has that $$K_{SE \times S} = \sigma_{0S}^2 \int_{-\frac{l_S}{2}}^{\frac{l_S}{2}} \cos^2\left(\pi \frac{u}{l_S}\right) e^{-\left(\frac{r-u^2}{l_{SE}}\right)} du. \quad (54)$$

Via direct calculations the following indefinite integral is obtained:

$$J_{SE \times S}(u) = \int \cos^2\left(\pi \frac{u}{l_S}\right) e^{-\left(\frac{r-u^2}{l_{SE}}\right)} du \quad (55)$$
$$= \frac{\sqrt{\pi}}{4} l_{SE} \left[ \text{erf}\left(\frac{u-r}{l_{SE}}\right) + e^{-\left(\frac{l_{SE}}{l_S}\pi\right)^2} \text{Re}\left[e^{\frac{2\pi r}{l_S}i} \text{erf}\left(\frac{u-r}{l_{SE}} - i\frac{l_{SE}}{l_S}\pi\right)\right] \right].$$

From eq. (54) and (55) one has that $$K_{SE \times S} = \quad (56)$$
$$\sigma_0^2 \frac{\sqrt{\pi}}{4} l_{SE} \left[ e^{-\left(\frac{l_{SE}}{l_S}\pi\right)^2} \text{Re}\left(e^{\frac{2\pi r}{l_S}} \left[ \text{erf}\left(\frac{l_S}{2 l_{SE}} - \frac{r}{l_{SE}}\right) + \text{erf}\left(\frac{l_S}{2 l_{SE}} - \frac{r}{l_{SE}}\right) + \right.\right.$$
$$\left.\left. \text{erf}\left(\frac{l_S}{2 l_{SE}} - \frac{r}{l_{SE}} - i\frac{l_{SE}}{l_S}\pi\right) + \text{erf}\left(\frac{l_S}{2 l_{SE}} + \frac{r}{l_{SE}} + i\frac{l_{SE}}{l_S}\pi\right) \right] \right) \right].$$

Appendix D

Definitions for the squared exponential, Matern 3/2 and sparse covariance functions:

$$k_{SE}(r; l_{SE}) = \exp\left[-\frac{1}{2}\left(\frac{r}{l_{SE}}\right)^2\right] \text{ Squared Exponential}$$

$$k_M(r; l_M) = \left(1 + \sqrt{3}\frac{r}{l_M}\right) \exp\left(-\sqrt{3}\frac{r}{l_M}\right) \text{ Matérn 3/2}$$

$$k_S(r; l_S) = \left[\frac{2 + \cos\left(2\pi\frac{r}{l_S}\right)}{3}\left(1 - \frac{r}{l_S}\right) + \frac{1}{2\pi}\sin\left(2\pi\frac{r}{l_S}\right)\right] H(l_S - r) \text{ Sparse}$$

where $l_{SE}$, $l_M$ and $l_S$ are the length scales for the squared exponential, Matérn 3/2 and sparse covariance functions respectively, and H(x) is the Heaviside unit step function.

From these definitions, the following cross covariance functions can be derived:

Squared Exponential×Matern 3/2

$$k_{SE \times M}(r; l_{SE}, l_M) = \sqrt{\frac{l_{SE}}{l_M}} \left(\frac{3}{8}\pi\right)^{1/4}$$

-continued $$\exp\left[\frac{3}{4}\left(\frac{l_{SE}}{l_M}\right)^2\right]\left[\begin{array}{l}2\cosh\left(\frac{\sqrt{3}\,r}{l_M}\right)--\exp\left(\sqrt{3}\,\frac{r}{l_M}\right)\mathrm{erf}\left(\frac{\sqrt{3}}{2}\frac{l_{SE}}{l_M}+\frac{r}{l_{SE}}\right)-\\ \exp\left(-\sqrt{3}\,\frac{r}{l_M}\right)\mathrm{erf}\left(\frac{\sqrt{3}}{2}\frac{l_{SE}}{l_M}-\frac{r}{l_{SE}}\right)\end{array}\right]$$

where the error function erf(x) is defined as $$\mathrm{erf}(x) = \frac{2}{\sqrt{\pi}} \int_0^\infty e^{-t^2} dt$$

and r=|x−x'|.
Matern 3/2×Matern 3/2

$$k_{M_1\times M_2}(r; l_1, l_2) = \frac{2\sqrt{l_1 l_2}}{l_1^2 - l_2^2}\left[l_1\exp\left(-\sqrt{3}\,\frac{r}{l_1}\right) - l_2\exp\left(-\sqrt{3}\,\frac{r}{l_2}\right)\right]$$

where r=|x−x'| and $l_1$ and $l_2$ are the length scales.
Sparse×Sparse $$k_{S_1\times S_2}(r; l_1, l_2) = \frac{2}{3\sqrt{l_1 l_2}}\begin{cases} l_{min} + \frac{1}{\pi}\frac{l_{max}^3}{l_{max}^2 - l_{min}^2}\sin\left(\pi\frac{l_{min}}{l_{max}}\right)\cos\left(\frac{2\pi r}{l_{max}}\right) & \text{if } r \le \frac{|l_2 - l_1|}{2} \\ \frac{l_1+l_2}{2} - r + \frac{1}{2\pi(l_1^2 - l_2^2)}\left[\begin{array}{l}l_1^3\sin\left(\pi\frac{l_2 - 2r}{l_1}\right)-\\ l_2^3\sin\left(\pi\frac{l_1 - 2r}{l_2}\right)\end{array}\right] & \text{if } \frac{|l_2 - l_1|}{2} \le r \le \frac{l_1 + l_2}{2} \\ 0 & \text{if } \frac{l_1 + l_2}{2} \le r \end{cases}$$

where H(x) is the Heaviside unit step function, $l_{min}$=min($l_1$, $l_2$), $l_{max}$=max ($l_1$, $l_2$), $l_1$ and $l_2$ are the length scales, and r=|x−x'|.
Squared Exponential×Sparse $$k_{SE\times S}(r; l_{SE}, l_S) = \tag{24}$$

$$(2\pi)^{1/4}\sqrt{\frac{l_{SE}}{6l_S}}\left[\mathrm{erf}\left(\frac{l_S}{2l_{SE}} - \frac{r}{l_{SE}}\right) + \mathrm{erf}\left(\frac{l_S}{2l_{SE}} + \frac{r}{l_{SE}}\right) + e^{-\left(\frac{l_{SE}}{l_S}\pi\right)^2}\mathrm{Re}\left(e^{\frac{2\pi r}{l_S}i}\left[\mathrm{erf}\left(\frac{l_S}{2l_{SE}} - \frac{r}{l_{SE}} - i\frac{l_{SE}}{l_S}\pi\right) + \mathrm{erf}\left(\frac{l_S}{2l_{SE}} + \frac{r}{l_{SE}} + i\frac{l_{SE}}{l_S}\pi\right)\right]\right)\right],$$

where r=|x−x'|.
Matern 3/2×Sparse $$k_{M\times S}(r; l_M, l_S) = \frac{8\sqrt{2}}{3^{3/4}}\sqrt{\frac{l_M}{l_S}}\frac{\pi^2 l_M^2}{4\pi^2 l_M^2 + 3l_S^2}\sinh\left(\frac{\sqrt{3}}{2}\frac{l_S}{l_M}\right)\exp\left(-\sqrt{3}\,\frac{r}{l_M}\right),$$

where r=|x−x'| and $l_M$ and $l_S$ are the length scales.

Squared Exponential×Squared Exponential $$k_{SE_1\times SE_2}(r; l_1, l_2) = \sqrt{\frac{2l_1 l_2}{l_1^2 + l_2^2}}\,\exp\left(-\frac{r^2}{l_1^2 + l_2^2}\right),$$

where r=|x−x'|.
For the general anisotropic case:

$$k_{SE_1}(x, x'; \Omega_1) = \exp\left[-\frac{1}{2}(x-x')^T \Omega_1^{-1}(x-x')\right]$$

$$k_{SE_2}(x, x'; \Omega_2) = \exp\left[-\frac{1}{2}(x-x')^T \Omega_2^{-1}(x-x')\right]$$

$$k_{SE_1\times SE_2}(x, x'; \Omega_1, \Omega_2) =$$

$$2^{D/2}\frac{|\Omega_1|^{1/4}|\Omega_2|^{1/4}}{\sqrt{|\Omega_1 + \Omega_2|}}\exp[-(x-x')^T(\Omega_1+\Omega_2)^{-1}(x-x')]$$

Multidimensional and anisotropic extensions to the other models are possible by taking the product of the cross covariance terms defined for each input dimension.

(23)

The examples above do not consider parameters for the amplitude (signal variance) of the covariance functions. This, however, can be added by multiplying blocks of the multi-task covariance matrix by coefficients from a PSD matrix.

What is claimed is:

1. A system for analyzing and synthesizing data from a plurality of sources of sample data by Gaussian process learning and regression, the system comprising:
data storage with a stored multi-task covariance function and associated hyperparameters, and
an evaluation processor in communication with the data storage that:
performs Gaussian process regression using the stored sample data and multi-task covariance function with the hyperparameters and
synthesizes prediction data for use in graphical display or digital control,
wherein the multi-task covariance function is a combination of a plurality of stationary covariance functions.

2. The system of claim 1 further comprising a training processor to determine the hyperparameters by analyzing the sample data and the multi-task covariance function.

3. The system of claim 1 wherein the sampled measurement data is derived from measurement of a plurality of quantities dependent and distributed over a spatial region or temporal period.

4. The system of claim 3 wherein the sampled measurement data is derived from sensors measuring a plurality of quantities at spatially distributed locations within a region.

5. The system of claim 4 wherein the sensors measure quantities related to geology and/or rock characteristics within the region.

6. The system of claim 1 wherein the multi-task covariance function is determined by a selected combination of separate stationary covariance functions for each task corresponding to a separate source of sampled measurement data.

7. The system of claim 6 wherein the covariance functions for each separate task are the same.

8. The system of claim 6 wherein the covariance functions for each separate task are different.

9. The system of claim 6 wherein at least one of the covariance functions combined into the multi-task covariance function is a squared-exponential covariance function.

10. The system of claim 6 wherein at least one of the covariance functions combined into the multi-task covariance function is a Sparse covariance function.

11. The system of claim 6 wherein at least one of the covariance functions combined into the multi-task covariance function is a Matern covariance function.

12. The system of claim 1 wherein the cross-covariance function is determined by selecting a stationary covariance function for each data source task, and combining the plurality of covariance functions using Fourier transform and convolution techniques.

13. A method of computerized data analysis and synthesis for estimation of a desired first quantity comprising:
measuring the first quantity and at least one other second quantity within a domain of interest to generate first and second sampled datasets,
storing the sampled datasets,
selecting first and second stationary covariance functions for application to the first and second datasets,
determining a multi-task covariance function determined from the selected first and second covariance functions,
training a multi-task Gaussian process by computing and storing optimized hyperparameter values associated with the multi-task covariance function using the stored first and second datasets, and
performing Gaussian process regression using the selected multi-task covariance function, computed and stored hyperparameters and stored datasets to predict unknown values of the first quantity within the domain of interest.

14. The method of claim 13 wherein the first and second quantities are spatially distributed measureable quantities.

15. The method of claim 14 wherein the first and second quantities are derived from geological characteristics within a body of earth.

16. The method of claim 13 wherein the first and second covariance functions are the same.

17. The method of claim 13 wherein the first and second covariance functions are different.

18. A method for determining a Gaussian process for regression of a plurality of related tasks comprising:
receiving a data set associated with each one of the plurality of related tasks;
receiving one covariance function associated with each one of the related tasks; and
using the data sets and covariance functions to determine a multi-task covariance function, for use with the multi-task Gaussian process.

19. The method of claim 18 wherein the multi-task covariance function is determined in a training phase.

20. The method of claim 18 wherein the multi-task covariance function K is determined from a basis function, g, associated with each covariance function, using the relationship described as follows:

$$K((x, i), (x', j)) = \int_{-\infty}^{\infty} g_i(x-u) g_j(x'-u) du$$

where i and j identify the task number and (x, i), (x', j) represent the points x and x' from the task i and j respectively.

21. A method for evaluating a task from a Gaussian process regression model, wherein the task is one of a plurality of dependent tasks, and the Gaussian process regression model includes a Gaussian process, the Gaussian process being associated with a covariance function, the covariance function being a multi-task covariance function.

22. The method of claim 21 wherein the multi-task covariance function is determined by a method comprising:
receiving a data set associated with each one of the plurality of related tasks;
receiving one covariance function associated with each one of the related tasks; and
using the data sets and covariance functions to determine a multi-task covariance function, for use with the multi-task Gaussian process.

23. A computer program comprising machine-readable program code for controlling the operation of a data processing apparatus on which the program code executes to perform a method for determining a Gaussian process for regression of a plurality of related tasks comprising:
receiving a data set associated with each one of the plurality of related tasks;
receiving one covariance function associated with each one of the related tasks; and
using the data sets and covariance functions to determine a multi-task covariance function, for use with the multi-task Gaussian process.

24. A computer program product comprising machine-readable program code recorded on a non-transitory machine-readable recording medium, for controlling the operation of a data processing apparatus on which the program code executes to perform a method for determining a Gaussian process for regression of a plurality of related tasks comprising:
receiving a data set associated with each one of the plurality of related tasks;
receiving one covariance function associated with each one of the related tasks; and
using the data sets and covariance functions to determine a multi-task covariance function, for use with the multi-task Gaussian process.

25. A system for analyzing a plurality of data sets, each data set associated with a single-task covariance function, the system comprising:
a multi-task Gaussian process training processor that analyzes the plurality of data sets simultaneously to determine a multi-task covariance function,
wherein the multi-task covariance function is a combination of the single-task covariance functions.

26. A system for synthesizing a data set from a test input data set, wherein the data set comprises data from one of a plurality of data types, each data type being associated with a single-task covariance function, the system comprising:
a multi-task Gaussian process associated with a multi-task covariance function, wherein the multi-task covariance function is a combination of the single-task covariance functions; and a Gaussian process evaluation processor that inputs the test input data set, and uses the multi-task Gaussian process to synthesize the data set.

27. A method for computer regression of a plurality of related tasks, the method comprising:
- receiving a data set associated with each one of the plurality of related modelling tasks;
- assigning a data set kernel for each of the data sets;
- simultaneously modelling the data sets using a kernel process in which the kernel is a convolution of the data set kernels.

28. The method of claim 27, wherein the data set kernel for one of the plurality of data sets is different from the data set kernel for another of the plurality of data sets.

29. A method for computer regression of a plurality of related tasks, the method comprising:
- receiving values for inputs X, targets y, covariance function K, noise level $\sigma_n^2$, and test input X*, wherein X, y and X* are in the form of block vectors and K is in the form of a block matrix comprising covariance functions for each input X along its diagonal and cross-covariance functions formed by a convolution of covariance functions outside of its diagonal;
- applying the covariance function K to the inputs X, targets y, noise level $\sigma_n^2$, and test input X*, in a predictive process and outputting a model of the inputs X.

30. A non-transitory computer readable medium including instructions for a method comprising:
- receiving a data set associated with each one of a plurality of related modelling tasks;
- simultaneously modelling the data sets using a kernel process in which the kernel is a convolution of kernels assigned to each data set.

31. A non-transitory computer readable medium including instructions for a method comprising:
- implementing regression of a plurality of related tasks, by:
  - receiving values for inputs X, targets y, covariance function K, noise level $\sigma_n^2$, and test input X*, wherein X, y and X* are in the form of block vectors and K is in the form of a block matrix comprising covariance functions for each input X along its diagonal and cross-covariance functions formed by a convolution of covariance functions outside of its diagonal;
  - applying the covariance function K to the inputs X, targets y, covariance function K, noise level $\sigma_n^2$, and test input X*, in a predictive process and outputting a model of the inputs X.

* * * * *